(12) United States Patent
Cui et al.

(10) Patent No.: US 12,365,612 B2
(45) Date of Patent: Jul. 22, 2025

(54) TARGET BASED TIDAL FLAT WETLAND RESTORATION METHOD

(71) Applicant: Institute of Ecological Conservation and Restoration, Chinese Academy of Forestry, Beijing (CN)

(72) Inventors: Lijuan Cui, Beijing (CN); Maosong Liu, Beijing (CN); Wei Li, Beijing (CN); Manyin Zhang, Beijing (CN); Zhiguo Dou, Beijing (CN); Xiajie Zhai, Beijing (CN); Xinsheng Zhao, Beijing (CN)

(73) Assignee: Institute of Ecological Conservation and Restoration, Chinese Academy of Forestry, Beijing (CN)

( * ) Notice: Subject to any disclaimer, the term of this patent is extended or adjusted under 35 U.S.C. 154(b) by 236 days.

(21) Appl. No.: 18/131,826

(22) Filed: Apr. 6, 2023

(65) Prior Publication Data
US 2024/0010534 A1      Jan. 11, 2024

(51) Int. Cl.
*C02F 3/32* (2023.01)
*E02B 3/00* (2006.01)

(52) U.S. Cl.
CPC ............... *C02F 3/327* (2013.01); *E02B 3/00* (2013.01)

(58) Field of Classification Search
CPC ................................. E02B 3/00; C02F 3/327
See application file for complete search history.

(56) References Cited

FOREIGN PATENT DOCUMENTS

| CN | 109650547 B | * | 10/2020 | ............... C02F 3/02 |
|---|---|---|---|---|
| CN | 111893948 A | * | 11/2020 | ............... C02F 3/32 |
| CN | 112136410 A | * | 12/2020 | ............... A01B 79/02 |
| CN | 112144467 A | * | 12/2020 | |
| CN | 113615469 A | * | 11/2021 | |
| CN | 113955905 A | * | 1/2022 | ............... C02F 1/006 |
| CN | 113979542 A | * | 1/2022 | |
| CN | 114014444 A | * | 2/2022 | |
| CN | 114215000 A | * | 3/2022 | |

OTHER PUBLICATIONS

Research on Ecological Restoration Technology and Application of Coastal Sale Marsh and its English summary of abstract; Dalian University of Technology; May 2020; 91 pages.

* cited by examiner

*Primary Examiner* — Frederick L Lagman

(74) *Attorney, Agent, or Firm* — Harness, Dickey & Pierce, P.L.C.; Anthony G. Fussner

(57) ABSTRACT

A target based tidal flat wetland restoration method comprises: (1) determining a target, (2) constructing an ecological unit by microtopography transformation on the tidal flat wetland required to be restored, (3) applying biochar material and salt-resistant ecological material within the ecological unit, (4) performing waterfront plant configuration within the ecological unit. The restoration method uses the natural tidal ebb and flow to adjust water and salt conditions in the ecological unit (salt content is reduced by more than 80%) and maintaining the target water level (0-2 m), optimized the structure of soil microbial community (the abundance of soil bacteria has been increased by more than 200%), improved the germination rate and survival rate of plants during tidal flat restoration process (the germination rate has reached more than 90%, and the survival rate has been increased to more than 62%), enriched plant species in waterfront zone (≥12 species).

10 Claims, 9 Drawing Sheets

TARGET BASED TIDAL FLAT WETLAND RESTORATION METHOD

CROSS-REFERENCE TO RELATED APPLICATION

This application claims priority to and the benefit of Chinese Application No. 202210807978.3, filed on Jul. 11, 2022. The entire disclosure of Chinese Application No. 202210807978.3 is incorporated herein by reference.

TECHNICAL FIELD

The present invention belongs to the technical field of wetland ecosystem restoration method, and specifically relates to a target based tidal flat wetland restoration method.

BACKGROUND

Wetlands are the habitat of many rare waterfowl and have a powerful ecological purification effect. Wetlands are known as "birds' paradise" and "kidney of earth", and provides human beings with food (aquatic products, livestock products, cereals), energy (hydroenergy, peat, fuelwood), raw materials (*Phragmites australis*, wood, medicinal plants) and recreational areas and other ecosystem services, which are an important foundation for human survival and sustainable development.

Wetland ecosystems are gaining increasing attention because of their important ecosystem service functions, but wetland ecosystems are also fragile and ecologically sensitive areas, and coupling of natural and anthropogenic factors has led to continuous evolution of tidal flat wetland ecosystems. With climate change and increase of human intervention ability, such as reclamation, excessive fishing and hunting, pollution, etc., stability of structure and function of the tidal flat wetland ecosystem is seriously weakened, resulting in degradation of the tidal flat wetland ecosystem. The degradation of the tidal flat wetland ecosystem is restored, effectively dealt with and solved through scientific methods and technical means, and the original structure and function of the tidal flat wetland ecosystem that has been damaged is restored and rebuilt.

However, there is no systematic theoretical guidance for implementation of tidal flat wetland restoration projects (whether human-led active restoration or passive natural restoration) worldwide, and there is a lack of science, coupled with the complexity of tidal flat wetland ecosystems, tidal flat wetland restoration and protection is still a long way to go.

Therefore, there is an urgent need for a method to restore tidal flat wetland based on scientific strategies and reasonable ecological unit design.

SUMMARY

For above need in the field, the present invention provides a target based tidal flat wetland restoration method, and application of this method can provide theoretical and technical support for tidal flat wetland restoration at a certain extent.

Technical solution of the present invention is as follows.
A target based tidal flat wetland restoration method, characterized in that, including:
(1) determining a target,
(2) constructing an ecological unit by microtopography transformation on the tidal flat wetland required to be restored,
(3) applying biochar material and salt-resistant ecological material within the ecological unit,
(4) performing waterfront plant configuration within the ecological unit;
said target is selected from one or more of groups consisting of: restoration of tidal flat wetland ecosystem function, target plant species restoration, target animal species restoration;
said restoration of tidal flat wetland ecosystem function is selected from one or more of groups consisting of: reducing or increasing soil salinity, changing direction and/or velocity of water flow to the tidal flat wetland, enhancing soil microbial abundance, changing vegetation diversity and/or coverage, and changing animal species and/or numbers;
said target plant species restoration means that the target plant species is maintained or restored to dominant species;
said target animal species restoration means that the target animal species is maintained or restored to dominant species;
said ecological unit is selected from two or more of groups consisting of a permanent water-covering unit, a seasonal water-covering unit, a deep-water unit, a shallow water unit, a permanent bare beach unit, an island-raised unit, an herb-dominated unit, an arbor-dominated unit, a stagnant zone unit, and a rapid flow zone unit;
said permanent water-covering unit means an ecological unit in which the percentage of water area on the ground surface in all seasons is 50%-100%,
said seasonal water-covering unit means: an ecological unit in which the percentage of water area on the ground surface in at least one of four seasons is 20%-100%,
said deep-water unit means: an ecological unit in which the depth of surface water cover in all seasons is 3-5 m,
said shallow water unit means: an ecological unit in which the depth of surface water cover in all seasons is 0.5-1 m,
said permanent bare beach unit means: an ecological unit in which the ground surface is not covered with vegetation in all seasons and maintains silty soil or sandy soil influenced by natural tides;
said island-raised unit means: an ecological unit with a surface area of more than 5 square meters of land in the waters that is exposed to the water regardless of rise and fall of the water and where vegetation grows,
said herb-dominated unit means: an ecological unit with vegetation cover greater than 65% and dominant species dominated by herbaceous plants,
said arbor-dominated unit means: an ecological unit with vegetation cover greater than 65% and in which the dominant species is dominated by arbor,
said stagnant zone unit means: an ecological unit in which the velocity of water body flow at the surface at low tide is slowed to ≤0.05 m/s;
said rapid flow zone unit means: an ecological unit in which the velocity of the water body flow at the surface at low tide is accelerated to ≥0.25 m/s;
said biochar material comprises 60% to 80% weight percentage of tamarisk branches biochar and 40% to 20% weight percentage of *Suaeda salsa* (L.) Pall. stalk biochar;

said salt-resistant ecological material comprises the following weight portions of raw materials: 40-50 portions of nano oyster shell, 10-20 portions of *Phragmites australis* biochar, 30-50 portions of *Phragmites australis* crushing and fermentation product, said microtopography transformation includes: straightening tidal ditch into water channel or directly excavating tidal ditch or water channel to form a rapid flow zone unit in a rapid flow zone unit, and/or, building mound or water guide bridge to form a stagnant zone unit in a stagnant zone ecological unit, and/or, deeply-excavating substrate to form an island-raised unit with a deep water area of 0.5-1 m depth in a pit ecological unit, and/or, cutting down the excessive steep slope in the shallow water ecological unit, controlling the terrain height of 0-0.4 m to form seasonal water-covering unit and/or shallow water unit and/or permanent bare beach unit, and/or deeply digging substrates in open water ecological units and leveling terrain to form deep water unit and/or permanent water-covering unit, and/or, within the open water ecological unit, deep excavation of the substrate and leveling of the topography to form a deep water unit and/or a permanent water unit, and/or, lowering the ground elevation below the ground elevation boundary $H_0$ to increase soil salinity or increasing the ground elevation above the ground elevation boundary $H_0$ to decrease soil salinity, and/or, constructing dike and/or wave abatement zone along the coast/river/lake, said ground elevation boundary $H_0$ equals to the sum of the groundwater table elevation $H_{water}$ and the capillary water rise height $H_{rise}$, said waterfront plant configuration means: reserving target plant and/or manually transplanting of target plant.

The target plant is selected from the following native mangrove plants: *Phragmites australis, Bolboschoenoplectus mariqueter, Suaeda salsa, Salicornia europaea, Cyperus malaccensis, Scirpus validus, Arundo donax, Phragmites karka, Enhalus acoroides, Kandelia obovata, Aegiceras corniculatum, Rhizophora apiculata, Acanthus ilicifolius, Acrostichum aureum, Sonneratia caseolaris, Sonneratia apetala, Excoecaria agallocha, Nypa fruticans, Rhizophora mangle, Sonneratia alba, Heritiera littoralis, Avicennia marina*;

the classification to which said target animal belongs is selected from: Anseriformes, Accipitriformes, Coraciiformes, Charadriiformes, Accipitriformes, Cuculformes, Ciconiiformes, Caprimulgiformes, Podicipediformes, Pelecaniformes, Passeriformes, Sulidae;

Preferably, when the target is the restoration of tidal flat wetland ecosystem function, at least six ecological units are constructed on the tidal flat wetland;

Preferably, when the target is the target plant species restoration, the permanent water-covering unit, deep water unit, shallow water unit, permanent bare beach unit, island-raised unit, herb-dominated unit, arbor-dominated unit, stagnant zone unit are constructed on the tidal flat wetland, Preferably, when the target is the target animal species restoration, the permanent water-covering unit, deep-water unit, shallow water unit, permanent bare beach unit, island-raised unit, herb-dominated unit, arbor-dominated unit, rapid flow zone unit are constructed on the tidal flat wetland.

Said applying biochar material and salt-resistant ecological material within the ecological unit means: adding biochar material and salt-resistant ecological material by rototilling soil in the unit at a depth of 30-80 cm, preferably 50 cm, Preferably, said biochar material and anti-salt ecological material are applied in an amount of 50-200 g/m² respectively, Preferably, said nano oyster shell is natural oyster shell calcined and ground into a nano-level product, Preferably, said *Phragmites australis* biochar is biochar product after charring *Phragmites australis* straw, Preferably, said *Phragmites australis* crushing and fermentation product is product of fermenting *Phragmites australis* straw with decomposing agent, Preferably, moisture content of said *Phragmites australis* crushing and fermentation product is controlled of 30% to 40%.

Reducing the ground elevation below the ground elevation threshold $H_0$ while increasing the water surface ratio to 50%-100% and reducing the vegetation coverage to 10%-50% to increase soil salinity, or, increasing the ground elevation above the ground elevation boundary $H_0$ while decreasing the water surface rate to 10%-30% and increasing the vegetation coverage to 80-90% to decrease soil salinity.

The abandoned fish ponds or bare flat on the tidal flat wetlands required to be restored are performed microtopography transformation to build ecological unit.

The microtopography transformation also includes: in the rapid flow zone unit, raising terrain in direction of the incoming water, which forms a sloping terrain with a slope of 10-20 degrees with direction of the outgoing water to form a rapid flow zone.

The length of the rapid flow zone is less than 100 m; preferably, the period of the tidal flat wetland restoration is 1-2 years.

The microtopography transformation further comprises: constructing a high beach ditch parallel to the bank on the middle beach near the high beach side of the tidal flat wetland required to be restored, constructing a low beach ditch parallel to the bank on the middle beach near the low beach side, constructing a diversion channel connecting the high beach ditch and the low beach ditch.

Preferably, the high beach refers to a tidal flat area with a topography of 3-5 m, said low beach means a tidal flat area with a topography of 0-1 m;

said medium beach refers to a tidal flat area with a topography of 1-3 m.

The depth of said high beach ditch is greater than 0.6 m and the width is greater than 1.2 m, said low beach ditch has a depth greater than 1.3 m and a width greater than 3.5 m, said diversion channel has a depth greater than 0.8 m and a width greater than 2.2 m.

In some embodiments of the invention, a preparation method of the salt-resistant ecological material is also provided. The preparation method comprises the following 3 steps in no order: preparing nano oyster shell, preparing *Phragmites australis* biochar, and preparing *Phragmites australis* crushing and fermentation product; the nano oyster shell, *Phragmites australis* biochar and *Phragmites australis* crushing and fermentation product are mixed.

Characterized in that, preparing nano oyster shell refers to: processing the natural oyster shell, calcining and grinding it into nano level product;

Preferably, the processing refers to: cleaning, drying and crushing the natural oyster shell;

More preferably, it is crushed into 0.5~1.0 cm fragments;

Preferably, high-temperature anoxic calcination is adopted; the calcination temperature is 400~600° C.; calcination time 4-6 h;

Preferably, the calcination process heats up at a constant speed at a rate of 10~15° C./min; after calcination, the temperature drops at a constant rate of 10~15° C./min;

Preferably, the calcination is carried out in a tubular furnace; the calcination process needs to be filled with protective gas;

More preferably, the protective gas is nitrogen or argon;

Preferably, after calcination, a ball mill is adopted to grind into a nanometer powder.

In some specific embodiments, the preparing *Phragmites australis* biochar refers to: *Phragmites australis* straw is prepared as biochar product after treating and carbonizing;

Preferably, the treating refers to: cleaning, drying and crushing *Phragmites australis* straw;

More preferably, the crushing refers to crushing and screening through a 50-80 mesh sieve;

Preferably, the carbonization temperature is 400~550° C.; the carbonization time is 3-5 h;

Preferably, the carbonization process is heating at a uniform rate at a rate of 5-10° C./min; after carbonization, the temperature drops at a constant rate of 15~20° C./min;

Preferably, the carbonization is carried out in a tubular furnace; the carbonization process needs to be filled with protective gas;

More preferably, the protective gas is nitrogen or argon.

In some embodiments, the preparing *Phragmites australis* crushing and fermentation product includes: fermentation is performed on crushed *Phragmites australis* straw with straw decomposition agent.

In other embodiments, preparing the straw decomposition agent refers to: each single strain of *Aspergillus niger, Aspergillus oryzae, Bacillus subtilis*, ordinary high-temperature actinomycetes, thermotolerant *Bacillus* and *Saccharomyces cerevisiae* is fermented respectively and mixed then;

Preferably, concentration of the single strain after fermentation is 3-4 billion copies/mL;

Preferably, *Aspergillus niger, Aspergillus oryzae, Bacillus subtilis*, ordinary high-temperature actinomycetes, thermotolerant *Bacillus* and *Saccharomyces cerevisiae* are mixed in the following volume ratios: 5~20:5~20:10~25:10~25: 10~25:10~25:10~25.

In more specific embodiments, the fermentation refers to: the crushed *Phragmites australis* straw is used as the composting substrate, and the straw decomposition agent is applied for fermentation;

Preferably, the crushed *Phragmites australis* straw means that the dried *Phragmites australis* straw is crushed into particles with size of 0.3~0.5 cm;

More preferably, the moisture of the composting substrate is adjusted to 70-80%;

Preferably, the pH of the straw decomposition agent is 3.5-6;

Preferably, the weight ratio of the straw decomposing agent to the composting substrate is 1:18000~12000;

Preferably, said the straw decomposition agent is applied means spraying the straw decomposition agent on surface of the composting substrate;

Preferably, the fermentation temperature is 35~65° C.; the fermentation time is 15-25 days;

More preferably, the composting substrate is stirred once 3 to 5 days after the straw decomposition agent is applied.

Other embodiments of the invention also provide the salt-resistant ecological material, and/or, application of the salt-resistant ecological material prepared according to the preparation method of the salt-resistant ecological material in repairing saline alkali soil of tidal flat wetlands and promoting growth of saline alkali plants;

In specific application examples, the salt-resistant ecological material is contacted or mixed with soil in the unit of the coastal tidal flat wetland required to be restored. The applied amount is 50-200 g/m$^2$.

The invention proposes for the first time a restoration method based on the natural geomorphology of tidal flat, the current vegetation types and coverage, the natural tidal ditch and the hydrological conditions, originates a concept of "ecological unit", and raises a series of wetland unit restoration technologies. As shown in FIG. 2, the restoration method includes unit division, creation of micro terrain within the unit, research and development of multi-dimensional water transfer bionic component (one-way vertical water separation and horizontal water interception), development and manufacture of saline alkali resistant ecological materials (composed of nano oyster shell, *Phragmites australis* biochar, and *Phragmites australis* crushing and fermentation product), waterfront plant configuration, etc. It has created nearly 10 ecological unit restoration models (FIG. 2), including "permanent/seasonal water-covering unit", "deep/shallow water unit", "permanent bare beach unit", "island-raised unit", and "herb/arbor dominated unit", which have blocked the rising process of capillary water in high salinity soil, and realized the functions of using natural tide fluctuations alone to adjust water and salt conditions in the ecological unit (salt content is reduced by more than 80%) and maintaining the target water level (0-2 m) as required, optimized the structure of soil microbial community (the abundance of soil bacteria has been increased by more than 200%), improved the germination rate and survival rate of plants during tidal flat restoration process (the germination rate has reached more than 90%, and the survival rate has been increased to more than 62%), enriched plant species in waterfront zone (≥12 species), broke the technical bottleneck of restoration of broken tidal flat wetlands in areas with highly intensive land use, and realized restoration of habitat of target species.

EMBODIMENTS

Figure 1:
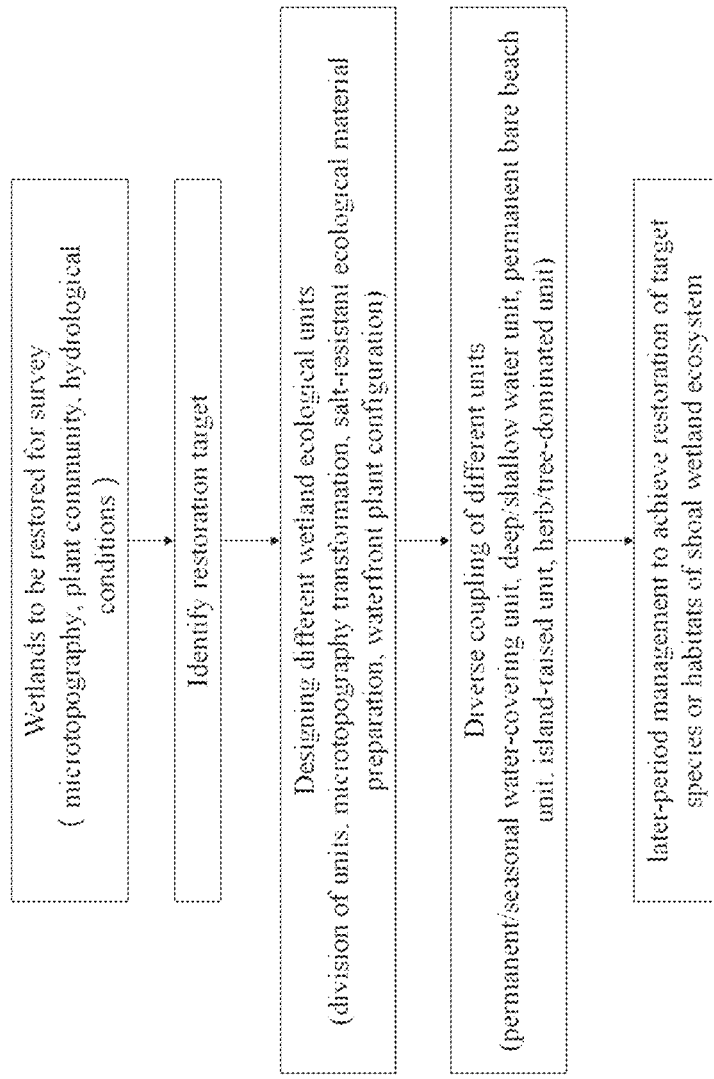
FIG. 1 shows a specific step flow chart of the tidal flat wetland restoration method provided by one embodiment of the invention.

The specific content of the invention is further described in detail in combination with specific embodiments and experimental examples, but this does not limit the protection content of the invention.

Examples Group 1, the Target Based Tidal Flat Wetland Restoration Method of the Invention The examples of this group provide a target based tidal flat wetland restoration method. All examples in this group have the following common features: the target based tidal flat wetland restoration method includes:

(1) determining a target,
(2) constructing an ecological unit by microtopography transformation on the tidal flat wetland required to be restored,
(3) applying biochar material and salt-resistant ecological material within the ecological unit,
(4) performing waterfront plant configuration within the ecological unit;

said target is selected from one or more of groups consisting of: restoration of tidal flat wetland ecosystem function, target plant species restoration, target animal species restoration;

said restoration of tidal flat wetland ecosystem function is selected from one or more of groups consisting of: reducing or increasing soil salinity, changing direction and/or velocity of water flow to the tidal flat wetland, enhancing soil microbial abundance, changing vegetation diversity and/or coverage, and changing animal species and/or numbers;

Changing diversity and coverage of vegetation can further enhance capacity of water conservation, water purification, climate regulation, carbon fixation and oxygen release. In some examples, changing vegetation diversity refers to changing type of vegetation.

said target plant species restoration means that the target plant species is maintained or restored to dominant species;

said target animal species restoration means that the target animal species is maintained or restored to dominant species;

said ecological unit is selected from two or more of groups consisting of a permanent water-covering unit, a seasonal water-covering unit, a deep-water unit, a shallow water unit, a permanent bare beach unit, an island-raised unit, an herb-dominated unit, an arbor-dominated unit, a stagnant zone unit, and a rapid flow zone unit;

said permanent water-covering unit means an ecological unit in which the percentage of water area on the ground surface in all seasons is 50%-100%;

said seasonal water-covering unit means: an ecological unit in which the percentage of water area on the ground surface in at least one of four seasons is 20%-100%;

said deep-water unit means: an ecological unit in which the depth of surface water cover in all seasons is 3-5 m;

said shallow water unit means: an ecological unit in which the depth of surface water cover in all seasons is 0.5-1 m;

said permanent bare beach unit means: an ecological unit in which the ground surface is not covered with vegetation in all seasons and maintains silty soil or sandy soil influenced by natural tides;

said island-raised unit means: an ecological unit with a surface area of more than 5 square meters of land in the waters that is exposed to the water regardless of rise and fall of the water and where vegetation grows, said herb-dominated unit means: an ecological unit with vegetation cover greater than 65% and dominant species dominated by herbaceous plants, said arbor-dominated unit means: an ecological unit with vegetation cover greater than 65% and in which the dominant species is dominated by arbor, said stagnant zone unit means: an ecological unit in which the velocity of water body flow at the surface at low tide is slowed to ≤0.05 m/s;

said rapid flow zone unit means: an ecological unit in which the velocity of the water body flow at the surface at low tide is accelerated to ≥0.25 m/s;

said biochar material comprises 60% to 80% weight percentage of tamarisk branches biochar and 40% to 20% weight percentage of *Suaeda salsa* (L.) Pall. stalk biochar; said salt-resistant ecological material comprises the following weight portions of raw materials: 40-50 portions of nano oyster shell, 10-20 portions of *Phragmites australis* biochar, 30-50 portions of *Phragmites australis* crushing and fermentation product;

said microtopography transformation includes: straightening tidal ditch into water channel or directly excavating tidal ditch or water channel to form a rapid flow zone unit in a rapid flow zone unit, and/or, building mound or water guide bridge to form a stagnant zone unit in a stagnant zone ecological unit, and/or, deeply-excavating substrate to form an island-raised unit with a deep water area of 0.5-1 m depth in a pit ecological unit, and/or, cutting down the excessive steep slope in the shallow water ecological unit, controlling the terrain height of 0-0.4 m to form seasonal water-covering unit and/or shallow water unit and/or permanent bare beach unit, and/or deeply digging substrates in open water ecological units and leveling terrain to form deep water unit and/or permanent water-covering unit, and/or, within the open water ecological unit, deep excavation of the substrate and leveling of the topography to form a deep water unit and/or a permanent water unit, and/or, lowering the ground elevation below the ground elevation boundary $H_0$ to increase soil salinity or increasing the ground elevation above the ground elevation boundary $H_0$ to decrease soil salinity, and/or, constructing dike and/or wave abatement zone along the coast/river/lake, said ground elevation boundary $H_0$ equals to the sum of the groundwater table elevation $H_{water}$ and the capillary water rise height $H_{rise}$;

said waterfront plant configuration means: reserving target plant and/or manually transplanting of target plant.

The target plant is selected from the following native mangrove plants: *Phragmites australis, Bolboschoenoplectus mariqueter, Suaeda salsa, Salicornia europaea, Cyperus malaccensis, Scirpus validus, Arundo donax, Phragmites karka, Enhalus acoroides, Kandelia obovata, Aegiceras corniculatum, Rhizophora apiculata, Acanthus ilicifolius, Acrostichum aureum, Sonneratia caseolaris, Sonneratia apetala, Excoecaria agallocha, Nypa fruticans, Sonneratia alba, Heritiera littoralis, Avicennia marina*;

the classification to which said target animal belongs is selected from: Anseriformes, Accipitriformes, Coraciiformes, Charadriiformes, Accipitriformes, Cucuiformes, Ciconiiformes, Caprimulgiformes, Podicipediformes, Pelecaniformes, Passeriformes, Sulidae;

Preferably, when the target is the restoration of tidal flat wetland ecosystem function, at least six ecological units are constructed on the tidal flat wetland;

Preferably, when the target is the target plant species restoration, the permanent water-covering unit, deep water unit, shallow water unit, permanent bare beach unit, island-raised unit, herb-dominated unit, arbor-dominated unit, stagnant zone unit are constructed on the tidal flat wetland, Preferably, when the target is the target animal species restoration, the permanent water-covering unit, deep-water unit, shallow water unit, permanent bare beach unit, island-raised unit, herb-dominated unit, arbor-dominated unit, rapid flow zone unit are constructed on the tidal flat wetland.

In other embodiments, said applying biochar material and salt-resistant ecological material within the ecological unit means: adding biochar material and salt-resistant ecological material by rototilling soil in the unit at a depth of 30-80 cm, preferably 50 cm, Preferably, said biochar material and anti-salt ecological material are applied in an amount of 50-200 g/m$^2$ respectively, Preferably, said nano oyster shell is natural oyster shell calcined and ground into a nano-level product, Preferably, said *Phragmites australis* biochar is biochar product after charring *Phragmites australis* straw, Preferably, said *Phragmites australis* crushing and fermentation product is product of fermenting *Phragmites australis* straw with decomposing agent, Preferably, moisture content of said *Phragmites australis* crushing and fermentation product is controlled of 30% to 40%.

In some embodiments, reducing the ground elevation below the ground elevation threshold $H_0$ while increasing the water surface ratio to 50%-100% and reducing the vegetation coverage to 10%-50% to increase soil salinity, or, increasing the ground elevation above the ground elevation boundary $H_0$ while decreasing the water surface rate to 10%-30% and increasing the vegetation coverage to 80%-90% to decrease soil salinity.

In some embodiments, the abandoned fish ponds or bare flat on the tidal flat wetlands required to be restored are performed microtopography transformation to build ecological unit.

In specific embodiments, the microtopography transformation also includes: in the rapid flow zone unit, raising terrain in direction of the incoming water, which forms a sloping terrain with a slope of 10-20 degrees with direction of the outgoing water to form a rapid flow zone.

In further examples, the length of the rapid flow zone is less than 100 m.

In more further examples, the microtopography transformation further comprises: constructing a high beach ditch parallel to the bank on the middle beach near the high beach side of the tidal flat wetland required to be restored, constructing a low beach ditch parallel to the bank on the middle beach near the low beach side, constructing a diversion channel connecting the high beach ditch and the low beach ditch.

Preferably, the high beach refers to a tidal flat area with a topography of 3-5 m, said low beach means a tidal flat area with a topography of 0-1 m;

said medium beach refers to a tidal flat area with a topography of 1-3 m.

In specific examples, the depth of said high beach ditch is greater than 0.6 m and the width is greater than 1.2 m, said low beach ditch has a depth greater than 1.3 m and a width greater than 3.5 m, said diversion channel has a depth greater than 0.8 m and a width greater than 2.2 m.

Examples Group 2, the Coastal Saline Alkali Soil Plant Breeding Salt-Resistant Ecological Material of the Invention The embodiments of this group provide a salt-resistant ecological material for plant breeding in coastal saline alkali soil, characterized in that, comprising nano oyster shell, *Phragmites australis* biochar, and *Phragmites australis* crushing and fermentation product.

In a specific embodiment, said salt-resistant ecological material for plant breeding in coastal saline alkali soil, characterized in that, comprising the following weight portions of raw materials: 40-50 portions of nano oyster shell, 10-20 portions of *Phragmites australis* biochar, 30-50 portions of *Phragmites australis* crushing and fermentation products;

Preferably, said nano oyster shell is natural oyster shell calcined and ground into a nano-level product, Preferably, said *Phragmites australis* biochar is biochar product after charring *Phragmites australis* straw, Preferably, said *Phragmites australis* crushing and fermentation product is product of fermenting *Phragmites australis* straw with decomposing agent, Preferably, moisture content of said *Phragmites australis* crushing and fermentation product is controlled of 30% to 40%.

Examples Group 3, the Preparation Method of the Salt-Resistant Ecological Material for Plant Breeding in Coastal Saline Alkali Soil of the Invention The embodiments of this group provide a preparation method of salt-resistant ecological material for plant breeding in coastal saline alkali soil described in any of the examples group 2, which comprises the following 3 steps in no order: preparing nano oyster shell, preparing *Phragmites australis* biochar, and preparing *Phragmites australis* crushing and fermentation product; the nano oyster shell, *Phragmites australis* biochar and *Phragmites australis* crushing and fermentation product are mixed.

In some embodiments, preparing nano oyster shell refers to: processing the natural oyster shell, calcining and grinding it into nano level product;

Preferably, the processing refers to: cleaning, drying and crushing the natural oyster shell;

More preferably, it is crushed into 0.5~1.0 cm fragments;

Preferably, high-temperature anoxic calcination is adopted; the calcination temperature is 400~600° C.; calcination time 4-6 h;

Preferably, the calcination process heats up at a constant speed at a rate of 10~15° C./min; after calcination, the temperature drops at a constant rate of 10~15° C./min;

Preferably, the calcination is carried out in a tubular furnace; the calcination process needs to be filled with protective gas;

More preferably, the protective gas is nitrogen or argon;

Preferably, after calcination, a ball mill is adopted to grind into a nanometer powder.

In some specific embodiments, the preparing *Phragmites australis* biochar refers to: *Phragmites australis* straw is prepared as biochar product after treating and carbonizing;

Preferably, the treating refers to: cleaning, drying and crushing *Phragmites australis* straw;

More preferably, the crushing refers to crushing and screening through a 50-80 mesh sieve;

Preferably, the carbonization temperature is 400~550° C.; the carbonization time is 3-5 h;

Preferably, the carbonization process is heating at a uniform rate at a rate of 5-10° C./min; after carbonization, the temperature drops at a constant rate of 15~20° C./min;

Preferably, the carbonization is carried out in a tubular furnace; the carbonization process needs to be filled with protective gas;

More preferably, the protective gas is nitrogen or argon.

In specific embodiments, the preparing *Phragmites australis* crushing and fermentation product includes: fermentation is performed on crushed *Phragmites australis* straw with straw decomposition agent.

Preparation of the straw decomposition agent comprises: each single strain of *Aspergillus niger, Aspergillus oryzae, Bacillus subtilis*, ordinary high-temperature actinomycetes, thermotolerant *Bacillus* and *Saccharomyces cerevisiae* is fermented respectively and mixed then;

Preferably, concentration of the single strain after fermentation is 3-4 billion copies/mL;

Preferably, *Aspergillus niger, Aspergillus oryzae, Bacillus subtilis*, ordinary high-temperature actinomycetes, thermotolerant *Bacillus* and *Saccharomyces cerevisiae* are mixed in the following volume ratios: 5~20:5~20:10~25:10~25:10~25:10~25:10~25.

Said fermentation is performed on crushed *Phragmites australis* straw refers to: the crushed *Phragmites australis* straw is used as the composting substrate, spraying the straw decomposing agent is sprayed on surface of the composting substrate, and mixed for fermentation;

Preferably, the crushed *Phragmites australis* straw means that the dried *Phragmites australis* straw is crushed into particles with size of 0.3~0.5 cm;

More preferably, the moisture of the composting substrate is adjusted to 70-80%;

Preferably, the pH of the straw decomposition agent is 3.5-6;

Preferably, the weight ratio of the straw decomposing agent to the composting substrate is 1:18000~12000;

Preferably, the fermentation temperature is 35~65° C.; the fermentation time is 15-25 days;

More preferably, the composting substrate is stirred once 3 to 5 days after the straw decomposing agent is applied.

Examples Group 4, Application of the Salt-Resistant Ecological Material for Plant Breeding in Coastal Saline Alkali Soil of the Invention The embodiments in this group provide an application of the salt-resistant ecological material for plant breeding in coastal saline alkali soil provided by any one of the examples group 2 and/or salt-resistant ecological material for plant breeding in coastal saline alkali soil prepared by preparation method in any one of examples group 3 in repairing coastal wetland saline soil and promoting growth of plants in saline alkali land.

In a specific embodiment, the salt-resistant ecological material for plant breeding in coastal saline alkali soil is contacted or mixed with the coastal wetland saline soil.

An embodiment of the invention provides a target based tidal flat wetland restoration method (FIG. 1), which includes the following steps:

Step 1: background investigation of tidal flat wetland required to be recovered; obtaining wetland area, wetland microtopography, wetland plant community, hydrological conditions, etc.

Step 2: establish restoration target; according to the investigation, determine the restoration target of the tidal flat wetland, such as, restoration of tidal flat wetland ecosystem function, target plant species restoration, and target animal species restoration.

Step 3: design different wetland ecological units; different restoration units are divided according to the restoration target, microtopography within the unit is created, salt-resistant ecological material is added, and different waterfront plant is configured.

Figure 2:
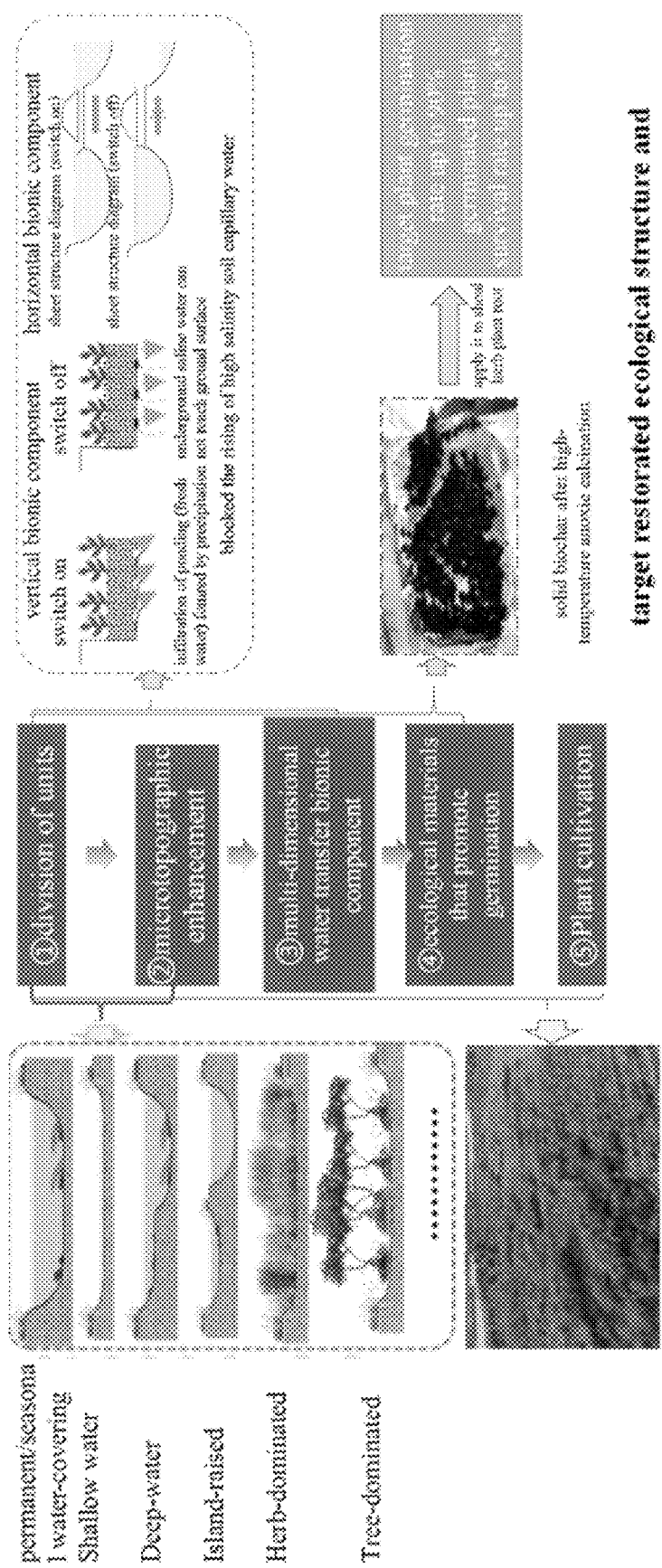
FIG. 2 shows a step flow diagram and effect diagram of the tidal flat wetland restoration method targeted at plant species restoration provided by one embodiment of the invention.

Step 4: multiple coupling modes among different ecological units; different ecological units are coupled according to the restoration target (FIG. 2).

Step 5: later-period management to achieve restoration of target species or habitats of tidal flat wetland ecosystem.

The investigation method of Step 1 is as follows: land use pattern and current situation analysis, environment (water quality, water area pattern, sediment, flow) investigation, and biological (animal and plant) investigation.

Land use pattern and current situation analysis, using aerial orthophoto map supplemented by field survey and camera capture.

Environmental investigation is with items that can be detected by portable instruments as principle, which include: water quality index temperature, dissolved oxygen, conductivity, pH value, turbidity; water area type velocity, water depth; bottom plasmid diameter; section flow.

Layout of monitoring points shall meet the following requirements: a) Whole monitoring and evaluation area shall be spatially covered, and the monitoring points shall be determined on the basis of comprehensive consideration of such factors as distribution of vegetation, water environment and substrate type in the area, so as to fully reflect the spatial heterogeneity of ecosystem in the investigated area; b) all representative plant community types shall be included; c) it's suitable for setting fixed points and quadrats, in order to long-term monitor.

The monitoring frequency requirements are as follows: a) the general situation of wetland ecosystem, soil/sediment characteristics, vegetation characteristics, interference factors, etc. shall be investigated at least once a year; b) biological communities and hydrological as well as water quality elements should be investigated 4 times a year according to different seasons; c) meteorological and atmospheric environment indicators shall be monitored continuously in real time; d) time for conducting the inter annual survey in the same season shall be fixed as same as possible, and deviation of the survey time shall not exceed 15 days; hydrologic and water quality elements should be investigated on spring tide days, and other elements should be investigated on neap tide days.

Step 2 is establishment of recovery targets. According to the results of step 1, if there are national protected animals & plants and endangered animals & plants in the area required to be restored, the animals and plants will be as the restoration target; if there are no national protected animals & plants and endangered animals & plants in the area required to be restored, whether there are invasive species and environmental pollution should be confirmed, and removal of invasive species as well as elimination of environmental pollution to restore tidal flat ecosystem are determined as the restoration target, at this time, the restoration target should be established with reference to the local animals and plants in the same area.

The step three is based on unit division to strengthen unit microtopography, and assist in adding multi-dimensional water transfer bionic components, adding saline alkali resistant ecological materials, and configuring different waterfront plants.

According to the bare flat, water area, vegetation and animals, the unit is divided into three types: terrain ecological unit, water environment ecological unit and biological chain ecological unit. Construction of topographical ecological unit: if the restoration target is to live and feed on overwintering wetland animals and wetland natatores, base is dug deeply to form a deep water area and build a wetland pit ecological unit with a depth of 0.5 m-1 m, which is better that the bottom water body in the coldest month where the tidal flat wetland is located will not freeze, and reserve a flowing water body is reserved with a depth of 0.5 m; if the restoration target is tidal flat waterfowl, an open tidal flat ecological unit suitable for tidal flat wetland waterfowl is created through local micro terrain adjustment on the fluctuating open ground section closing water, cutting down steep area to a slope of less than 15 degrees. Construction of water environment ecological unit: if the restoration target is *Phragmites australis*, a low salt ecological unit is built on the area with high salt content in the tidal flat wetland by introducing fresh water to reduce soil salinity, inhibit growth of *Suaeda heteroptera*, promote the growth of *Phragmites australis*, and promote succession of *Suaeda heteroptera* community to *Phragmites australis* community. Construction of biological chain ecological unit: a suitable habitat for beneficial microorganisms, zooplankton, fish, aquatic insects and birds and other wetland biological communities is provided by putting local species of filter feeding wetland animals into the eutrophic waters, inhibiting growth of cyanobacteria, restoring water environment suitable for growth of wetland plants including submerged plants, so as to restore the virtuous cycle and self-purification capacity of wetland ecosystem.

The multi-dimensional water transfer bionic component includes two modes of infiltration and water storage. Core of the component is a switchable spring sheet structure, as shown in FIG. 2; the spring sheet specifically includes two kinds of application designs, the vertical spring sheet structure and the horizontal spring sheet structure.

A salt alkali resistant ecological material is characterized in that it includes 40-50 portions of nano oyster shells, 10-20 portions of *Phragmites australis* biochar, and 30-50 portions of *Phragmites australis* crushing and fermentation product. Wherein, nano oyster shell is the product of natural oyster shell calcined and ground into nano scale, and *Phragmites australis* biochar is the biochar product after *Phragmites australis* straw treatment and carbonization, the *Phragmites australis* crushing and fermentation product is to ferment the crushed *Phragmites australis* straw with decomposition agent (each single strain of *Aspergillus niger, Aspergillus oryzae, Bacillus subtilis*, ordinary high-temperature actinomycetes, thermotolerant *Bacillus* and *Saccharomyces cerevisiae* is separately fermented and then mixed in equal proportion). The method of applying saline alkali resistant ecological material is mixed in the depth of 50 cm of tidal flat with rotary tillage.

Local plants are selected for waterfront plants, which are determined according to the restoration target animal feeding habits.

The basis for multiple coupling among different units in step 4 is: based on the goals of step 2, like the ecosystem function restoration, target plant species restoration, and target animal species restoration, in combination with wetland area and background conditions, the wetland ecological unit in step 3 is modular combined.

The specific embodiments of multiple coupling among different units in step 4 include but are not limited to: "herb/arbor dominated unit", "permanent/seasonal water-covering unit", "deep/shallow water unit", "permanent bare beach unit", and "island-raised unit".

The management mode of Step 5 is to focus on natural restoration and carry out regular monitoring. When the monitoring target of the ecosystem changes by more than 20%, manual management measures (such as removal of invasive species) will be taken. Refer to step 1 for the layout and frequency of monitoring points.

The target based ecological tidal flat wetland restoration method proposed by the invention can clarify the branch links and logical relationship in the wetland ecosystem protection and restoration, help to better improve the wetland ecosystem structure, improve the wetland ecosystem process, and enhance the wetland ecosystem services.

When the target is plant species restoration, it can be carried out according to the step flow chart shown in FIG. 2 in combination with the above steps 1 to 5, and the corresponding plant restoration effect can be obtained.

Figure 3:
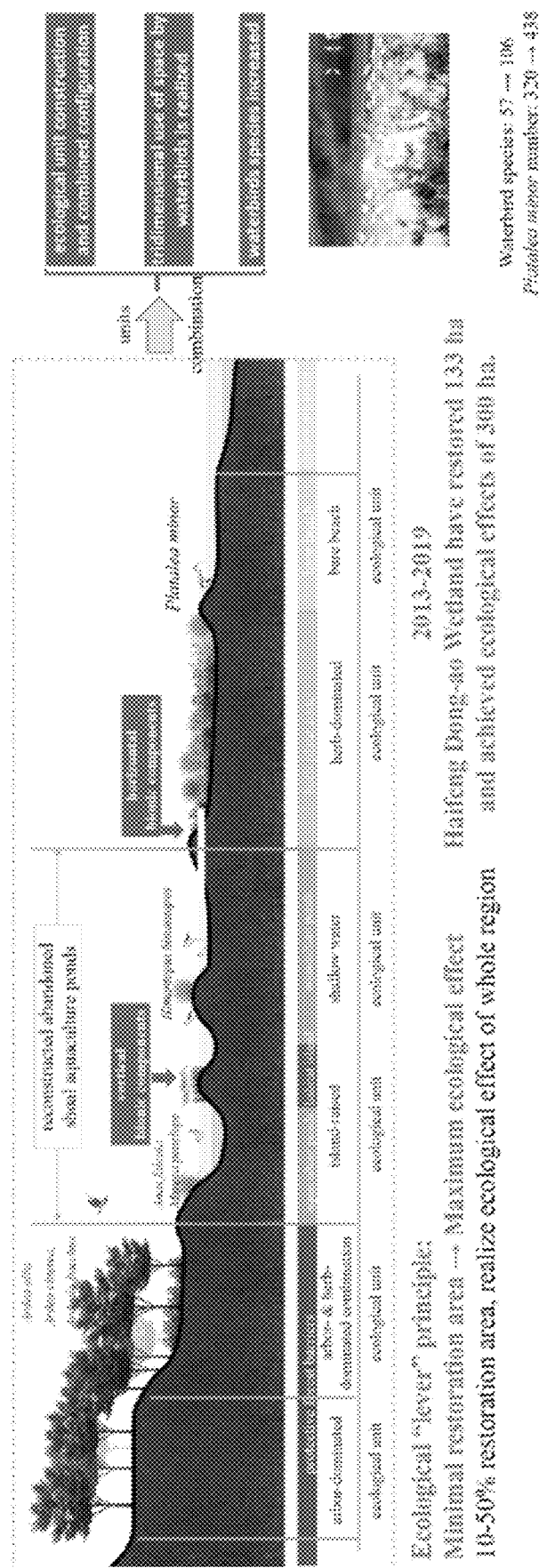
FIG. 3 is a step flow diagram and effect diagram of the tidal flat wetland restoration method targeted at animal species restoration provided by another embodiment of the invention.

Another embodiment of the invention provides a tidal flat wetland restoration method targeting the restoration of waterfowl species, as shown in FIG. 3. The above steps 1 to 5 are taken to carry out the restoration. According to the requirements of waterfowl such as waders, wild geese and ducks, and ciconiiformes for different functional habitats such as breeding, foraging, and recreation, the abandoned tidal flat aquaculture ponds are reconstructed by constructing coastal protective forest barriers, applying bionic components and ecological materials; the feeding sources of waterfowls are regulated, and the ecological unit mode of "seasonal water-covering unit+permanent bare beach unit+ herb dominated unit" is adopted, to build an high tide breeding nest habitat for waders such as kentish Plover, golden waders and black winged stilts; the breeding nest habitat of wild goose and duck waterfowl is constructed by adopting the ecological unit model of "permanent water-coveringunit+island-raised unit+herb dominated unit"; the on-demand connectivity technology between ecological units based on horizontal bionic components is developed, which realizes the material circulation and energy flow between ecological units; the unit construction technology based on the hydrological connection between the natural tidal creek and the external environment has been developed to realize the food exchange between the ecological unit and the surrounding area (FIG. 3). This technology has increased the species of waterfowl in the restoration area by 86%, the species of waders by 68%, and the number of globally endangered species of black faced spoonbill by 37%, significantly increasing the species and number of waterfowl in the habitat restoration area.

Experimental Example 1: Targeted Restoration of Waterbirds in Haifeng Dong-Ao Wetland, Guangdong Province, China 1.1 Soil Improvement of Coastal Tidal Flat (Mainly Concentrated in Herb Dominant Unit and Tidal Flats Unit)

Through soil improvement, the biodiversity of benthic animals and crabs is improved, and the healthy growth of plants in tidal flat wetland is realized. By adding wetland plant biocarbon materials and salt-resistant ecological materials to the 50 cm depth of the tidal flat through rotary tillage, the amount of 50-200 g/m² is applied to improve the soil pH and soil biological activity of the tidal flat.

1.1 Soil Improvement Using Coastal Wetland Plant Biochar as Material

A kind of composite biochar for soil improvement and its preparation method can adsorb and degrade pollutants in soil and increase soil organic matter and microbial content, while improving saline soil in coastal wetlands.

Composite biochar for soil improvement includes Tamarisk branchesbiochar and Suaeda salsa (L.) Pall. stalkbiochar, including the following weight percentages of biochar raw materials: Tamarisk branchesbiochar 60%~80%, Suaeda salsa (L.) Pall. stalkbiochar 40%~20%, specifically: Tamarisk branchesbiochar 63%, Suaeda salsa (L.) Pall. stalkbiochar 37%; Tamarisk branchesbiochar 65%, Suaeda salsa (L.) Pall. stalkbiochar 35%; Tamarisk branchesbiochar 60%, Suaeda salsa (L.) Pall. stalkbiochar 40%; Tamarisk branchesbiochar 68%, Suaeda salsa (L.) Pall. stalkbiochar 32%; Tamarisk branchesbiochar 70%, Suaeda salsa (L.) Pall. stalkbiochar 30%; Tamarisk branchesbiochar 72%, Suaeda salsa (L.) Pall. stalkbiochar 28%; Tamarisk branchesbiochar 75%, Suaeda salsa (L.) Pall. stalkbiochar 25%; Tamarisk branchesbiochar 78% Suaeda salsa (L.) Pall. stalkbiochar 22%; Alternatively, Tamarisk branchesbiochar 80%, Suaeda salsa (L.) Pall. stalkbiochar 20%. Tamarisk branchesbiochar refers to: the biochar product obtained after carbonization of Tamarisk branches; Suaeda salsa (L.) Pall. stalkbiochar refers to the biochar product obtained after carbonization of the stalk of the Suaeda salsa (L.) Pall. The preparation of composite charcoal includes carbonization of the branches of Tamarisk branches to obtain Tamarisk branchesbiochar, carbonization of the stalk of Suaeda salsa (L.) Pall. to obtain Suaeda salsa (L.) Pall. stalkbiochar, and then mixing Tamarisk branchesbiochar with Suaeda salsa (L.) Pall. stalkbiochar. Tamarisk branches biochar is prepared according to the following steps: the branches of Tamarisk are cleaned, dried, crushed to powder and placed in the furnace, the temperature is raised to 350~450° C. at a uniform speed and kept the temperature for 3-5 h, and then the temperature is uniformly cooled to room temperature; Suaeda salsa (L.) Pall. stalk biocharis prepared according to the following steps: the branches of Suaeda salsa (L.) Pall. stalkare cleaned, dried, crushed to powder and placed in the furnace, the temperature is raised to 300~400° C. at a uniform rate and kept the temperature for 2~3 h, and then is cooled to room temperature at a uniform speed; crushing refers to 50~80 mesh sieve; uniform temperature rise refers to heating at a rate of 5~10° C./min; uniform cooling in the preparation step of Tamarisk branches biochar refers to: cooling at a rate of 15~20° C./min, and the uniform cooling in the preparation step of saline Suaeda salsa (L.) Pall. stalk biochar refers to: cooling at a speed of 10~15° C./min; during the preparation of Tamarisk branches biochar and Suaeda salsa (L.) Pall. stalk biochar, a protective gas needs to be introduced when the powder is placed in the furnace, and the protective gas is nitrogen or argon.

In addition to above-mentioned composite biochars, trace elements are added, and a soil amendment coated with composite biochars is obtained by mixing and stirring with the composite biochars. Trace elements are mainly selected from one or two of zinc sulfate, nano-iron, silicon dioxide, manganese sulfate, boric acid, molybdenum acid, and then the mixed material is granulated with a disc granulator, and the moisture content in the granulation process is controlled at 15~20%, the particle size is controlled at 3~6 mm, and after the granulation is completed, it is dried at 60~80° C. for 3~5 h.

The composite biochar/soil amendment contains Tamarisk branches biochar and Suaeda salsa (L.) Pall. stalk biochar which is matching as the weight ratio of 60%~80%: 40%~20%, with Tamarisk branches biochar as the main and Suaeda salsa (L.) Pall. stalk biochar as supplement. It can maximize the effect of composite biochar/soil amendment both in reducing soil salinity and improving soil organic matter.

1.2 Soil Improvement for the Application of Plant Breeding Salt-Resistant Ecological Materials Nano oyster shell, Phragmites australis ecological carbon, Phragmites australis crushing and fermentation product. Among them, the raw materials for preparing soil improvement composite biochar include nano oyster shell (40%~50%), Phragmites australis biochar (10%~20%), Phragmites australis crushing and fermentation product (30%~50%); Nano oyster shell for soil improvement refers to natural oyster shell calcined at high temperature (400~600° C.) and then ground into nano-level products by ball mill; Phragmites australis crushing and fermentation product refers to the product of straw fermentation after drying and crushing into 0.3~0.5 cm granules by a crusher.

Preparation of decomposition agent: the following microorganisms are fermented in a single way (using conventional methods): Aspergillus niger, Aspergillus oryzae, Bacillus subtilis, ordinary high-temperature actinomycetes, thermotolerant Bacillus and Saccharomyces cerevisiae (all present to achieve better results); Aspergillus niger, Aspergillus oryzae, Bacillus subtilis, ordinary high-temperature actinomycetes, thermotolerant Bacillus and Saccharomyces cerevisiae are mixed respectively with the following liquid volume percentages of 5~20%, 5~20%, 10~25%, 10~25%, 10~25%, to obtain the original bacterial liquid.

Phragmites australis straw biochar preparation: according to the preparation method, the Phragmites australis straw is prepared according to the following steps: the Phragmites australis straw is cleaned, dried, crushed to powder and placed in the furnace, the temperature is raised to 400~550° C. at a uniform speed and kept the temperature for 3-5 h, and then the temperature is uniformly cooled to room temperature.

Nano oyster shell powder can make the soil have water retention (drought resistance, waterlogging resistance), fertilizer retention (slow release and long-term effect) and air permeability (frost resistance, activation of root system), can improve soil physical structure, promote soil microbial reproduction, promote crop absorption of soil nutrients, so as to achieve the purpose of increasing yield and improving quality.

Conditioned soil pH value (bidirectional adjustment), calcined oyster shell powder PH value greater than 9, neutralize acidic soil. The adsorption of the microporous structure can well adsorb harmful hydroxides, sodium ions, chloride ions, etc. that cause the soil pH value to rise, reduce the pH value, and make the soil environment suitable for plant growth.

Oyster shell contains rich natural porous surface, and is an ideal carrier for material attachment; nitrogen fertilizer prepared with oyster shell powder has a slow-release effect, can prolong the release time of fertilizer nutrients, improve fertilizer utilization rate, and is very suitable for fertilizer in acidic soil. The long-term use of chemical fertilizers makes the soil compaction acidify, and alkaline oyster shell powder as a calcium supplement fertilizer can play a good role in increasing yield.

A mixing method of salt-resistant ecological materials for plant breeding in coastal saline soil, the prepared related materials are mixed according to the following weight percentages: nano oyster shell (40%~50%), *Phragmites australis* biochar (10%~20%), *Phragmites australis* crushing and fermentation product (30%~50%, moisture content controlled at 30%~40%).

2. Ecological Unit Construction

With the abandoned aquaculture ponds and tidal flats as the main implementation areas, multiple ecological units are coupled to create suitable habitats for organisms, improve biodiversity, and the preferable target is wetland waterbirds.

2.1 Construction of Tidal Flat Wetland Ecological Unit Based on Microtopographic Enhancement Technology (1) Construction of Shallow-Water and Permanent Tidal Flats Ecological Units in Tidal Flat Wetland Shallow waters restore aquatic and wet plant communities (e.g. *Casuarina equisetifolia, Melia azedarach, Vitex trifolia, Pandanus tectorius, Scaevola sericea* Vahl, *Ipomoea pescaprae, Canavalia rosea, Melanthera prostrata*) and bird habitats (e.g. *Ardea cinerea, Ardeola bacchus, Ardea alba*) and increase biodiversity. The shallow waters provide water, bathing and shelter from predators for wetland birds, as well as spawning ground for amphibians, insects and some fish and shrimp. Shallow terrain restoration generally reduces the overly steep area by making local micro-terrain adjustments on the open area near the undulating water, and the restoration of the area with high terrain can create an open tidal flat suitable for wetland water birds. The water depth of the shallow water area of the tidal flat wetland is controlled at 0-0.2 m and 0.2-0.4 m according to different terrain heights.

(2) Construction of Deep-Water Ecological Unit in Tidal Flat Wetland

Meet the wintering of wetland animals and the habitat as well as foraging of wetland natatores. The main feature of deep-water terrain in nature is that it is concave distribution, and different depths adapt to the survival of animals and plants at different times. Through the restoration of topography of middle and deep water areas of the wetland restoration area, the habitat and feeding needs of natatores in the wetland waterbirds can be met. In order to achieve stratification of water temperature in the deep water area and meet the habitat as well as wintering needs of wetland animals and wetland natatores, its terrain restoration is mainly concave terrain restoration, and the base is excavated deeply to form into a deep water area, and the depth of 0.5-1 m is better to keep the bottom water without frozen and reserve a flowing water body with depth of 0.5 m in the coldest month where the wetland restoration area is located.

(3) Construction of Permanent Water-Covering Ecological Unit in Tidal Flat Wetland.

There are many fish and birds distributed in open water area, which is an ideal place for wetland birds, especially water birds such as geese, to run and take off. Open water fish and birds are more abundant. Restoration of open water must first determine the horizontal direction and spatial scale according to the activity range of wetland waterbirds, and then use the manner of vertical (longitudinal) upward deep excavation on base, flatten the terrain, and horizontal spatial extension to achieve. Experiment of bird habitat construction has transformed the original tidal wetland, which is dominated by *Phragmites australis* communities, into a wetland bird habitat with open water surface, shallow and vegetation composite structure (40% of open water surface area, 30% of shallow water, and 30% of vegetation).

(4) Construction of Ecological Unit of Tidal Flat Wetland Stagnant Zone

Stagnant zone ecological unit can make the water quickly recede when the tide recedes; by building small mounds and inverted bridges in the unit, the water can be kept in the unit for a longer time, and water can slowly recede by seeping into soil. The stagnant zone ecological unit realizes stagnant effect in the direction of tidal outflow by slowing down flow speed of water body, increasing the residence time of water body, and indirectly increasing the water depth, so as to adapt to the water level requirements of some wetland vegetation. The flow velocity of surface water in the stagnant zone ecological unit at low tide is ≤0.05 m/s.

Adapt to the water level requirements of some wetland vegetation, especially restoration of vegetation with water depth requirements. Restore part of area of swamp plant community dominated by *Phragmites australis* and other plants to increase the number of birds. *Sporobolus alterniflorus* cannot grow in an anaerobic or tidal environment, and its growth can be inhibited by influence of long-term flooding or tidal control. Stagnant terrain restoration can be achieved by raising the terrain in outlet direction to form a basement structure similar to shape of a dike, or by piling stones at the base in outlet direction to slow down flow of water body, or by constructing a retaining wall to increase the residence time of water body, to realize water stagnation effect. It can be transformed into a stagnant zone with a gentle slope (slope ratio 1:10, top width 1-2 meters), allowing tide flooding to form a closed area, reasonably setting height of the stagnant zone (50 cm) to ensure that there is a suitable water level in the area after each falling tide, a diverse habitat suitable for the rest of different waders is formed by combining with the undulating micro-terrain in the area. Stagnant zones can indirectly increase water depth to accommodate the water level requirements of some wetland vegetation.

(5) Construction of Rapid Flow Zone Ecological Unit of Tidal Flat Wetland

Construction of rapid flow zone unit can make tide rise and recede faster. By transforming the original curved small tidal trench at site, it is straightened and turned into a shallow water channel to accelerate the rapid flow of tide water and make the rapid stream more obvious. If there is no suitable tidal trench for transformation on site, construction and trenching are required.

By shaping a band-like tidal channel, the rapid flow zone unit shortens the hydraulic residence time of tidal water and accelerates the flow speed of water body. The flow velocity of surface water bodies in the rapid flow zone unit at low tide is ≥0.25 m/s.

The tidal ditch width of the rapid flow zone is 0.5-5 m, preferably 3 m, the depth is 0.5-2 m, preferably 1 m, and the length is less than 100 m.

The rapid flow zone unit provides habitat for tidal flat wetland organisms, mainly algae, various insect larvae, and fish (including migratory fish). The rapid flow zones are mostly shaped into strips, the hydraulic residence time of water body is short, and reoxygenation rate and material migration conversion speed are faster. The topography restoration of the rapid flow zone is created by a combination of terrain elevation and terrain leveling, which raises the terrain in direction of incoming water and forms an inclined terrain with direction of outflow, with a slope of 10-20 degrees, and the length of the overall rapid flow zone is less than 100 m, to accelerate the flow speed of water body.

Figure 4:
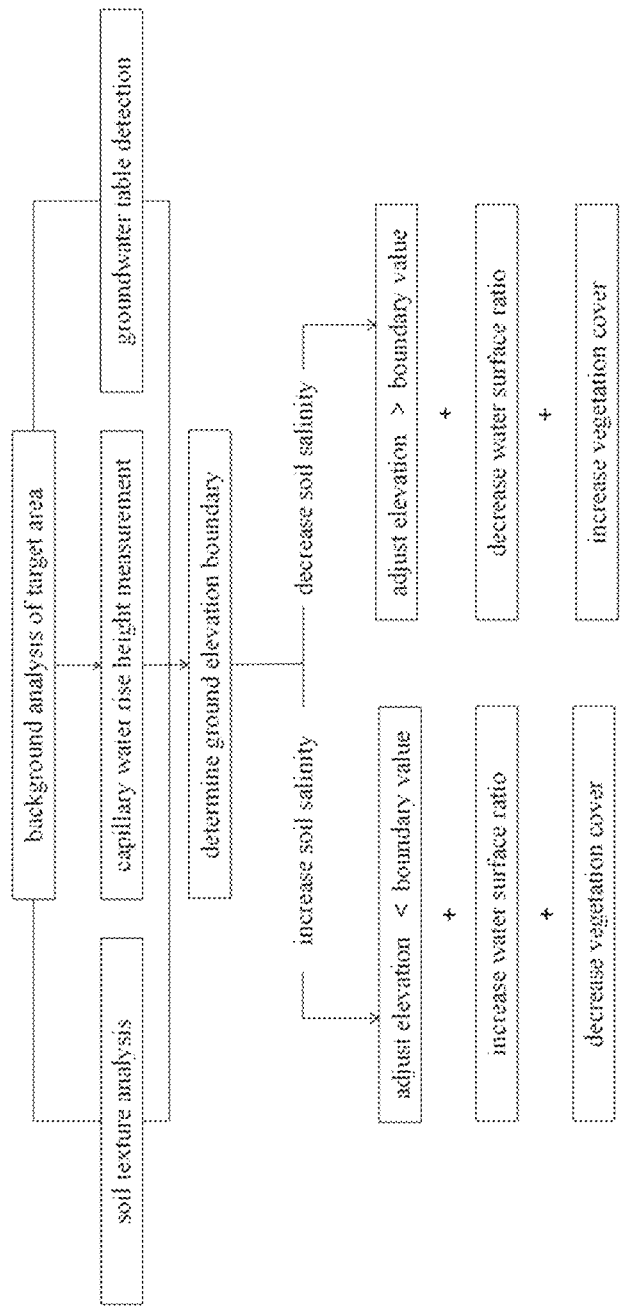
FIG. 4 is a technology road mapping of soil salt regulation based on micro topography and water surface ratio in an experimental example of the invention.

2.2 Multi-Pathway Cascade Coupling of Tidal Flat Wetland Based on Ecological Units Construction (1) Soil Salinity Regulation Based on Microtopography and Water Surface Rate Soil salinity regulation is performed as shown in FIG. 4:

Background analysis of target area: soil texture analysis is carried out by soil sampling to estimate height of capillary water rise; a special instrument is used to determine the soil capillary water rise height $H_{rise}$ and groundwater table elevation $H_{water}$ in the target area.

Determine ground elevation boundary: the ground elevation boundary $H_0$ is co-determined by the groundwater table elevation and the capillary water rise height, that is: $H_0=H_{rise}+H_{water}$.

Comprehensive measures for soil salinity regulation: if it is necessary to increase local soil salinity, ground elevation should be reduced to below the ground elevation boundary value H0, at the same time, water surface rate should be appropriately increased and vegetation coverage should be reduced to 20%-50%; on the contrary, if it is necessary to reduce the local soil salinity, ground elevation should be increased to above the ground elevation boundary H0, at the same time, water surface rate should be appropriately reduced and vegetation cover should be improved.

Figure 5:
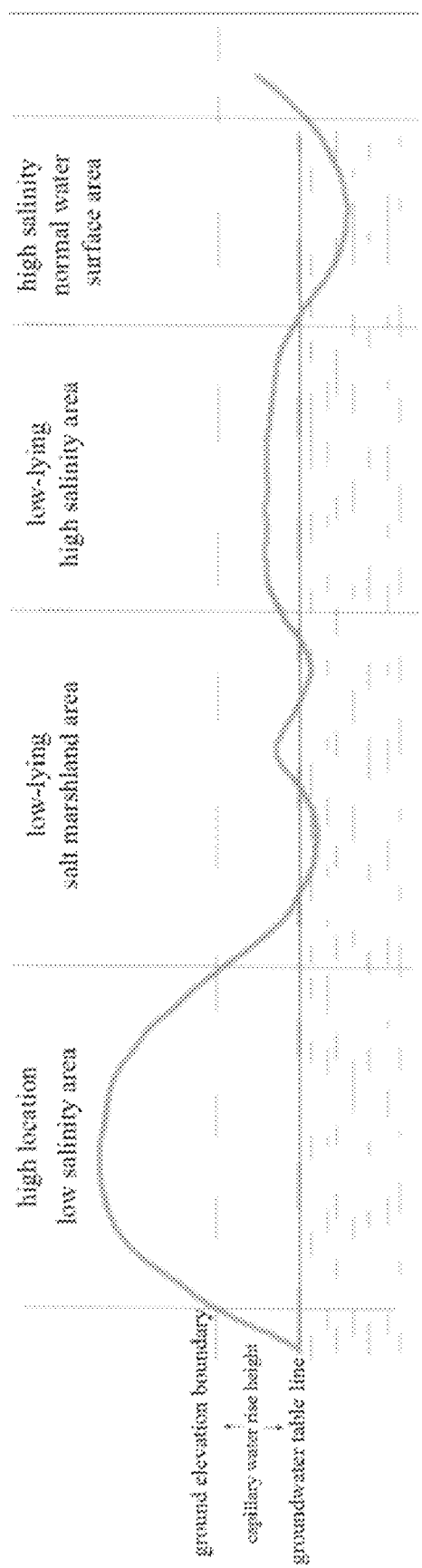
FIG. 5 is a schematic diagram of water salt regulation combined habitat with different micro topography and water surface ratio in an experimental example of the invention.

Technical method: the effect of salt increase or salt reduction on local tidal flats soil is achieved by constructing a low-lying normal water surface or local highland at different elevations to form a certain water surface and micro-terrain, as shown in FIG. 5.

Habitat I: High and High Vegetation Covered Area

Water enters soil through precipitation, followed by water infiltration, soil evaporation, plant transpiration, due to high vegetation coverage, vegetation water transpiration is large but soil water evaporation is small, aggregation effect of salt to soil surface is weak, usually precipitation is greater than evaporation, soil surface salt is low.

Habitat II: Low and Low Vegetation Covered Area or Unvegetation Mudflats

Water enters soil through precipitation, followed by water infiltration, soil evaporation, plant transpiration, due to low vegetation coverage or no vegetation cover, vegetation water transpiration is small or none, but soil water evaporation is large, aggregation effect of salt to the soil surface is strong, usually precipitation is often less than evaporation, soil surface salinity is high.

Habitat III: Low-Lying Shallow Water Area

Water enters the waterlogged area through precipitation, infiltration of water is zero, only evaporation of water on normal water surface is constant, evaporation of water on normal water surface is large, and salt of water body is concentrated.

(2) Construction of Habitat Sequence Based on Landscape Remodeling

Figure 6:
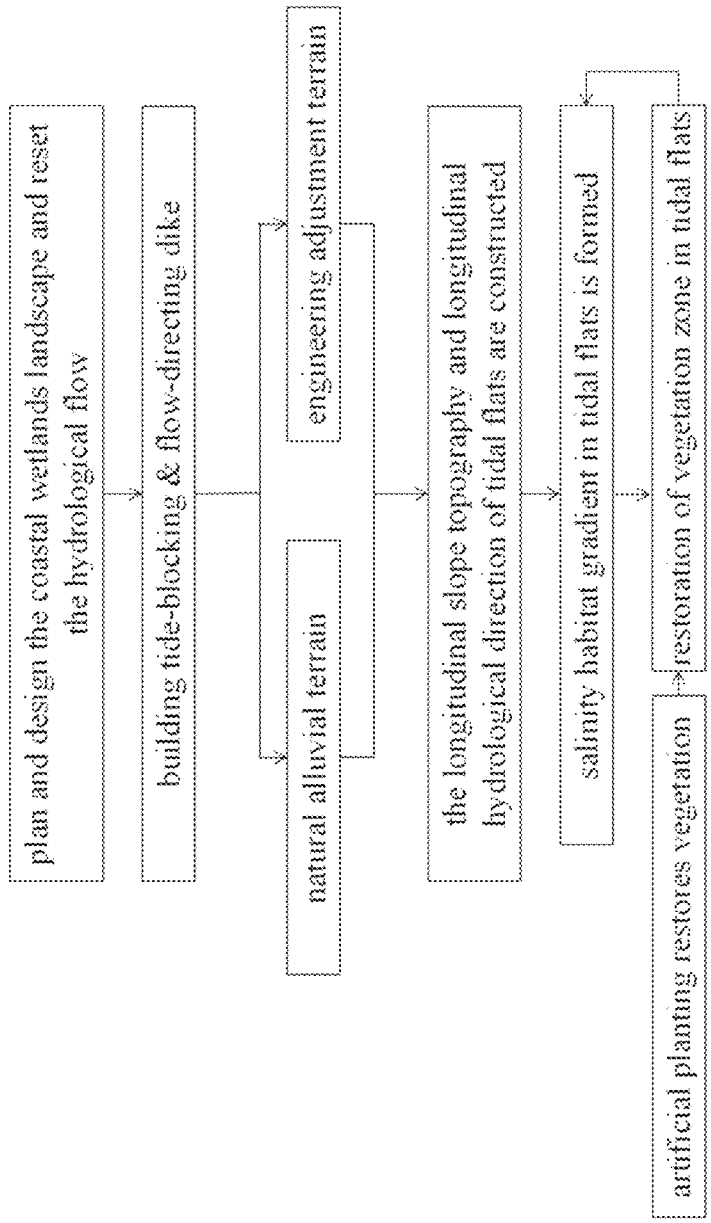
FIG. 6 is a technology road mapping of habitat sequence construction based on landscape remodeling in an experimental example of the invention.
Figure 7:
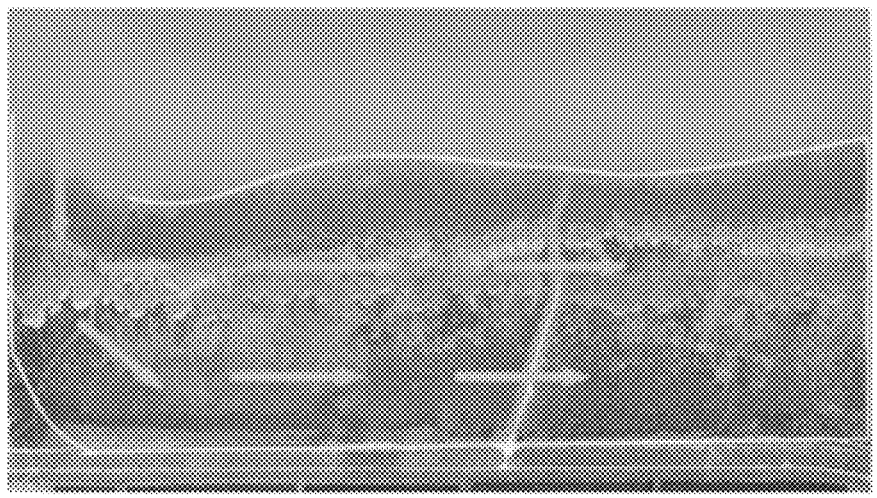
FIG. 7 is a schematic diagram of the "horizontal to vertical" project of tidal flat water flow direction in an experimental example of the invention, wherein the blue arrow refers to water flow direction, and the yellow line refers to the cofferdam or dam or wave dissipation belt.
Figure 7:
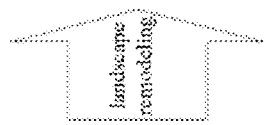
Figure 7:
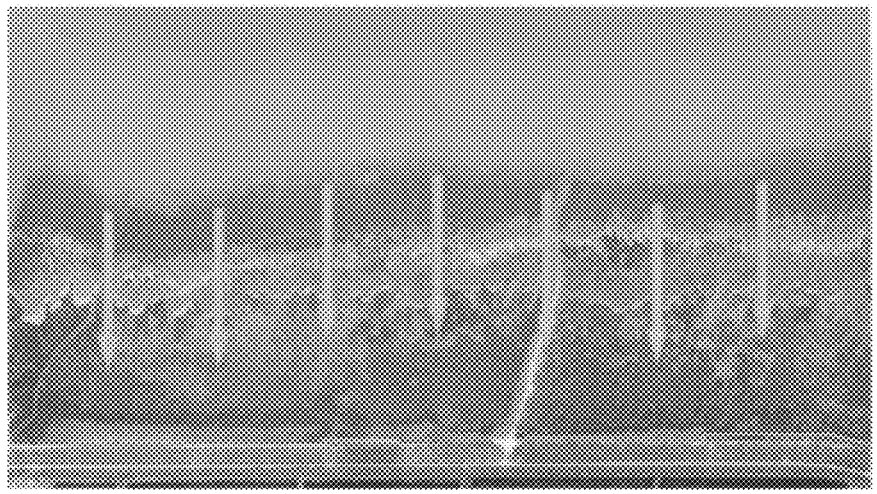

Technical methods: as shown in FIGS. 6 and 7, by building tide-blocking & flow-directing dikes to block the original tidal flat route of sea tide, and building wave abatement zones along the coastal dikes to reduce impact effect of waves against the dikes; at the same time, as the impact reshaping effect of hydrology on the original terrain under hydrology, in order to accelerate progress of terrain remodeling and accurately adjust elevation direction, it is necessary to manually carry out tidal terrain structure engineering. In process of vegetation restoration, it is necessary to artificially introduce transplanted species to promote construction of vegetation landscape gradient.

Figure 8:
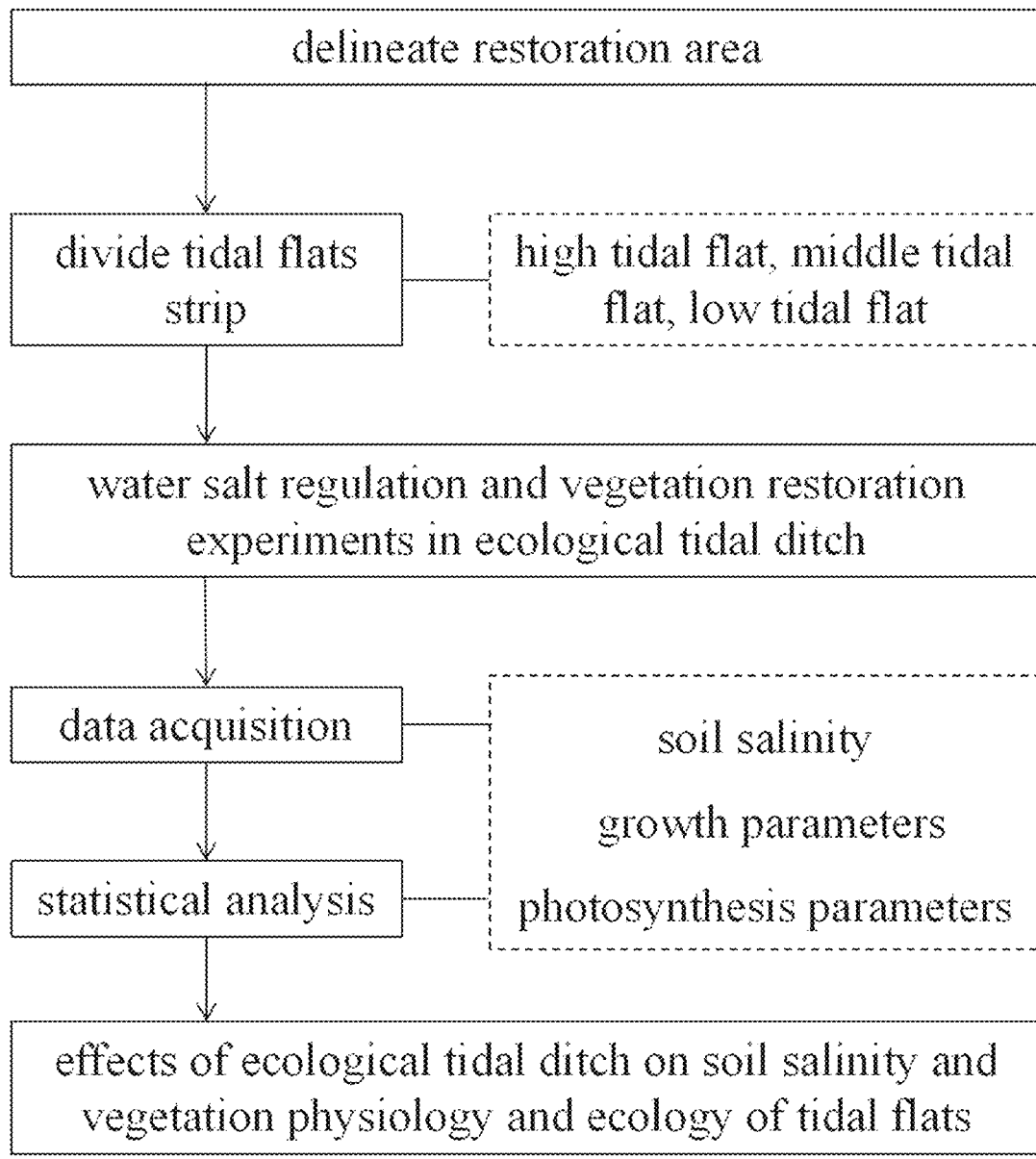
FIG. 8 is a technology road mapping of water salt regulation and vegetation restoration of ecological tidal ditch in an experimental example of the invention.

(3) Ecological Tidal Ditch Water Salt Regulation and Vegetation Restoration Technology As shown in FIG. 8, vegetation restoration area is delineated, and tidal ditch parallel to bank is constructed in high beach to intercept fresh water from the high beach; in the low beach, tidal ditch parallel to bank is constructed, to reduce groundwater table in the middle and low beach, relieve water accumulation state of low beach surface and middle layer of soil, so that process of salt replenishment of soil by tide can be fully carried out. In the middle tidal flats, a diversion channel connecting the high and low beaches is constructed, connecting above two tidal ditches is constructed, to direct fresh water intercepted by the high beach to the low beach. In the low tidal flats, tidal gullies that cross mangrove flatland, connect the middle tidal flats and ocean is constructed, which open up the silt highlands formed by silt promoted by mangrove forest, so that connectivity between the mangrove forest and the ocean is enhanced. Technical method: select area requiring vegetation control in tidal flat, divide the area into three strips including high tidal flat, middle tidal flat, low tidal flat, according to vegetation type and elevation, and investigate morphology and distribution of natural tidal ditch in each region, as a reference for ecological tidal ditch design. Use an excavator to dig a tidal ditch parallel to bank in the middle tidal flats area near the side of high beach, depth of the tidal ditch is greater than 0.6 m, and width is greater than 1.2 m; in the middle tidal flats, the tidal ditch parallel to bank is dug near the side of low beach side, depth of the tidal ditch is greater than 1.3 m, width is greater than 3.5 m; the natural tidal water volume encountered by the high beach is small without too much space needed, and the natural tidal water encountered by the low beach is large, and more space is needed to ensure smooth flow of water; soil generated by excavating the tidal ditch can be evenly accumulated in the middle tidal flats locally; use an excavator to dig a diversion channel perpendicular to bank between the constructed tidal ditches, depth of the diversion channel is greater than 0.8 m, and width is greater than 2.2 m; its function is to promote the smooth circulation of tidal water; the depth and width of the diversion channel can be appropriately changed according to topography and soil siltation degree along the passing area, and the natural tidal ditch in the area can be imitated, which can guide tidal water without silting.

Figure 9:
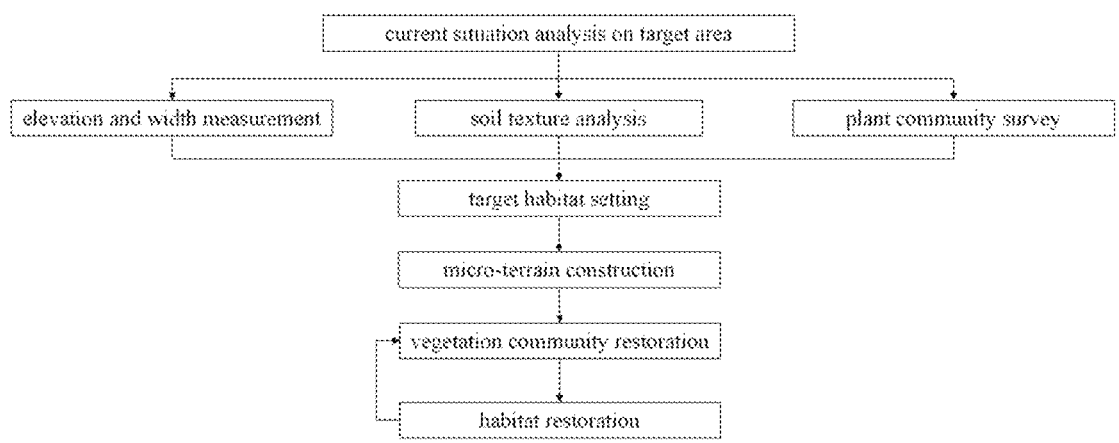
FIG. 9 is a technology road mapping for improving biodiversity through habitat complexity transformation in an experimental example of the invention.

(4) Technologies to Enhance Biodiversity Through Habitat Complexity Modification Technical methods: as shown in FIG. 9, through investigation on target habitat combined with construction target and status quo, microterrain is modified and structured, so as to achieve improvement of soil factors, restoration of vegetation communities and habitats, and improvement of ecosystem biodiversity.

3. Restorative Effect

Restoration period for this example was 1 year. The comparative experiments of various ecological indicators before and after restoration of tidal flat wetland are as follows:

3.1 Changes in Soil Salinity Before and After Restoration

Difference of soil salinity of tidal flats before and after restoration, 3 test points were selected in the tidal flats restoration area, 0-30 cm surface soil was sampled; soil salinity was measured by soil salinity analyzer, and the measurement results are shown in table 1 below:

TABLE 1

| Soil salinity value (g/kg) | Point 1 | Point 2 | Point 3 |
|---|---|---|---|
| Before restoration | 14.52 | 15.48 | 13.74 |
| After restoration | 2.85 | 2.79 | 2.33 |

3.2 Changes in Soil Microbial Community Structure Before and After Restoration

For difference in soil microbial community structure of tidal flats before and after restoration (taking soil bacterial richness as an example), 3 experimental areas were selected in the tidal flats restoration area, 0-30 cm surface soil was sampled, and the soil bacterial alpha diversity index (Chao1 index) was measured as the determination index of bacterial richness, and the specific results are shown in table 2 below:

TABLE 2

| Chao1 index | Point 1 | Point 2 | Point 3 |
|---|---|---|---|
| Before restoration | 898 | 1042 | 967 |
| After restoration | 3264 | 3346 | 3105 |

3.3 Statistical Changes in Plant Germination and Seedling Survival Before and After Restoration Plant germination experiment and seedling survival statistic before and after restoration (taking *Avicennia marina* as an example), 3 experimental areas were selected in the tidal flat restoration area, with an area of 10 square meters, and 100 seeds of *Avicennia marina* were sown; seed germination rate (germination number/100) and seedling survival rate (seedling survival number/100) were counted, and the statistical results of seed germination rate are shown in table 3 below:

TABLE 3

| Seed germination rate % | Point 1 | Point 2 | Point 3 |
|---|---|---|---|
| Before restoration | 67 | 59 | 63 |
| After restoration | 92 | 94 | 91 |

The statistical results of seedling survival rate are shown in Table 4 below:

TABLE 4

| Seedling survival rate % | Point 1 | Point 2 | Point 3 |
|---|---|---|---|
| Before restoration | 41 | 43 | 46 |
| After restoration | 68 | 70 | 62 |

3.4 Plant Changes in Waterfront Zone Before and After Restoration

Plant changes in waterfront zone before and after restoration are as follows:

Dominant species of original wetland plants: 9 species, including *Phragmites australis, Acrostichum aureum, Acanthus ilicifolius, Sonneratia caseolaris, Sonneratia apetala, Aegiceras corniculatum, Excoecaria agallocha, Laguncularia racemosa*, and *Avicennia marina*;

12 new dominant species of wetland plants were added: *Bolboschoenoplectus mariqueter, Enhalus acoroides, Heritiera littoralis, Kandelia obovata, Nypa fruticans, Rhizophora apiculata, Rhizophora mangle, Sonneratia alba, Arundo donax, Phragmites karka, Cyperus malaccensis, Scirpus validus*.

TABLE 5

| Dominant plant species | Guangdong Haifeng Dong-ao Wetland (unit: species) |
|---|---|
| Before restoration | 9 |
| After restoration | 21 |

3.5 Changes in Wetland Birds Before and After Restoration

A total of 57 species of wetland birds were counted before restoration, as shown in table 6 below. After restoration, a total of 106 species of wetland birds were counted, which are listed in table 7 below:

TABLE 6

| Order | Family | Species | Number |
|---|---|---|---|
| Anseriformes | Anatidae | Mareca penelope | 21 |
| Anseriformes | Anatidae | Anas zonorhyncha | 88 |
| Anseriformes | Anatidae | Spatula clypeata | 9 |
| Anseriformes | Anatidae | Anas acuta | 51 |
| Anseriformes | Anatidae | Anas crecca | 3 |
| Anseriformes | Anatidae | Aythya fuligula | 9 |
| Coraciiformes | Alcedinidae | Alcedo atthis | 10 |
| Cuculiformes | Cuculidae | Centropus sinensis | 5 |
| Gruiformes | Rallidae | Fulica atra | 1 |
| Gruiformes | Rallidae | Amaurornis phoenicurus | 3 |
| Gruiformes | Rallidae | Common Moorhen | 12 |
| Charadriiformes | Scolopacidae | Numenius phaeopus | 23 |
| Charadriiformes | Scolopacidae | Numenius arquata | 15 |
| Charadriiformes | Scolopacidae | Tringa erythropus | 21 |
| Charadriiformes | Scolopacidae | Tringa totanus | 33 |
| Charadriiformes | Scolopacidae | Tringa stagnatilis | 56 |
| Charadriiformes | Scolopacidae | Tringa nebularia | 110 |
| Charadriiformes | Scolopacidae | Tringa glareola | 568 |
| Charadriiformes | Scolopacidae | Calidris tenuirostris | 3 |
| Charadriiformes | Scolopacidae | Calidris ruficollis | 328 |
| Charadriiformes | Scolopacidae | Calidris alpina | 3389 |
| Charadriiformes | Scolopacidae | Calidris ferruginea | 284 |
| Charadriiformes | Rostratulidae | Greater Painted Snipe | 2 |
| Charadriiformes | Recurvirostridae | Himantopus himantopus | 536 |
| Charadriiformes | Recurvirostridae | Recurvirostra avosetta | 3326 |
| Charadriiformes | Charadriidae | Pluvialis squatarola | 46 |
| Charadriiformes | Charadriidae | Charadrius alexandrinus | 400 |
| Charadriiformes | Charadriidae | Vanellus vanellus | 5 |
| Charadriiformes | Laridae | Larus crassirostris | 20 |
| Charadriiformes | Laridae | Chroicocephalus ridibundus | 6126 |
| Charadriiformes | Laridae | Gelochelidon nilotica | 133 |
| Charadriiformes | Laridae | Chlidonias hybrida | 87 |
| Accipitriformes | Pandionidae | Pandion haliaetus | 6 |
| Podicipediformes | Podicedidae | Tachybaptus ruficollis | 106 |
| Podicipediformes | Podicedidae | Great Crested Grebe | 118 |
| Sulidae | Phalacrocoracidae | Phalacrocorax carbo | 435 |
| Pelecaniformes | Ardeidae | Egretta garzetta | 7526 |

TABLE 6-continued

| Order | Family | Species | Number |
|---|---|---|---|
| Pelecaniformes | Ardeidae | Ardea cinerea | 588 |
| Pelecaniformes | Ardeidae | Ardea alba | 6544 |
| Pelecaniformes | Ardeidae | Bubulcus coromandus | 355 |
| Pelecaniformes | Ardeidae | Ardeola bacchus | 233 |
| Pelecaniformes | Ardeidae | Nycticorax nycticorax | 18 |
| Pelecaniformes | Threskiorothidae | Platalea leucorodia | 1 |
| Pelecaniformes | Threskiorothidae | Platalea minor | 320 |
| Passeriformes | Laniidae | Lanius schach | 8 |
| Passeriformes | Muscicapidae | Saxicola maurus | 6 |
| Passeriformes | Sturnidae | Acridotheres cristatellus | 2 |
| Passeriformes | Pycnonotidae | Pycnonotus aurigaster | 3 |
| Passeriformes | Zosteropidae | Zosterops japonicus | 3 |
| Passeriformes | Remizidea | Chinese Penduline Tit | 54 |
| Passeriformes | Hirundinidae | Hirundo rustica | 211 |
| Passeriformes | Hirundinidae | Red-rumped Swallow | 2 |
| Passeriformes | Passeridae | Passer montanus | 35 |
| Passeriformes | Acrocephalidae | Acrocephalus orientalis | 1 |
| Passeriformes | Motacillidae | Motacilla tschutschensis | 31 |
| Passeriformes | Motacillidae | Anthus richardi | 3 |
| Passeriformes | Motacillidae | Anthus cervinus | 3 |
| Passeriformes | Cisticolidae | Yellow-bellied Prinia | 1 |

TABLE 7

| Order | Family | Species | Number |
|---|---|---|---|
| Anseriformes | Anatidae | Mareca penelope | 36 |
| Anseriformes | Anatidae | Anas zonorhyncha | 157 |
| Anseriformes | Anatidae | Spatula clypeata | 34 |
| Anseriformes | Anatidae | Anas acuta | 70 |
| Anseriformes | Anatidae | Anas crecca | 11 |
| Anseriformes | Anatidae | Aythya fuligula | 29 |
| Coraciiformes | Alcedinidae | Alcedo atthis | 24 |
| Coraciiformes | Alcedinidae | Halcyon smyrnensis | 6 |
| Cuculiformes | Cuculidae | Centropus bengalensis | 3 |
| Cuculiformes | Cuculidae | Centropus sinensis | 4 |
| Gruiformes | Rallidae | Fulica atra | 3 |
| Gruiformes | Rallidae | Amaurornis phoenicurus | 11 |
| Gruiformes | Rallidae | Gallirallus striatus | 3 |
| Gruiformes | Rallidae | Ruddy-breasted Crake | 3 |
| Gruiformes | Rallidae | Porphyrio poliocephalus | 3 |
| Gruiformes | Rallidae | Common Moorhen | 22 |
| Gruiformes | Rallidae | Rallus indicus | 1 |
| Charadriiformes | Scolopacidae | Common Snipe | 2 |
| Charadriiformes | Scolopacidae | Limosa lapponica | 2 |
| Charadriiformes | Scolopacidae | Numenius phaeopus | 48 |
| Charadriiformes | Scolopacidae | Limosa limosa | 3 |
| Charadriiformes | Scolopacidae | Numenius arquata | 54 |
| Charadriiformes | Scolopacidae | Tringa erythropus | 38 |
| Charadriiformes | Scolopacidae | Tringa totanus | 79 |
| Charadriiformes | Scolopacidae | Tringa stagnatilis | 132 |
| Charadriiformes | Scolopacidae | Tringa nebularia | 269 |
| Charadriiformes | Scolopacidae | Green Sandpiper | 1 |
| Charadriiformes | Scolopacidae | Tringa glareola | 1265 |
| Charadriiformes | Scolopacidae | Xenus cinereus | 6 |
| Charadriiformes | Scolopacidae | Actitis hypoleucos | 27 |
| Charadriiformes | Scolopacidae | Calidris tenuirostris | 66 |
| Charadriiformes | Scolopacidae | Calidris ruficollis | 553 |
| Charadriiformes | Scolopacidae | Calidris temminckii | 13 |
| Charadriiformes | Scolopacidae | Calidris alpina | 4652 |
| Charadriiformes | Scolopacidae | Calidris acuminata | 1 |
| Charadriiformes | Scolopacidae | Calidris ferruginea | 292 |
| Charadriiformes | Scolopacidae | Calidris falcinellus | 8 |
| Charadriiformes | Scolopacidae | Limnodromus scolopaceus | 1 |
| Charadriiformes | Scolopacidae | Calidris ferruginea | 2 |
| Charadriiformes | Scolopacidae | Phalaropus lobatus | 4 |
| Charadriiformes | Jacanidae | Hydrophasianus chirurgus | 2 |

TABLE 7-continued

| Order | Family | Species | Number |
|---|---|---|---|
| Charadriiformes | Rostratulidae | Greater Painted Snipe | 5 |
| Charadriiformes | Recurvirostridae | Himantopus himantopus | 543 |
| Charadriiformes | Recurvirostridae | Recurvirostra avosetta | 4384 |
| Charadriiformes | Charadriidae | Pluvialis fulva | 88 |
| Charadriiformes | Charadriidae | Pluvialis squatarola | 51 |
| Charadriiformes | Charadriidae | Charadrius dubius | 65 |
| Charadriiformes | Charadriidae | Charadrius alexandrinus | 470 |
| Charadriiformes | Charadriidae | Charadrius mongolus | 29 |
| Charadriiformes | Charadriidae | Charadrius leschenaultii | 79 |
| Charadriiformes | Charadriidae | Vanellus vanellus | 5 |
| Charadriiformes | Laridae | Larus crassirostris | 32 |
| Charadriiformes | Laridae | Chroicocephalus ridibundus | 8454 |
| Charadriiformes | Laridae | Gelochelidon nilotica | 165 |
| Charadriiformes | Laridae | Chroicocephalus saundersi | 7 |
| Charadriiformes | Laridae | Hydroprogne caspia | 7 |
| Charadriiformes | Laridae | Sternula albifrons | 18 |
| Charadriiformes | Laridae | Chlidonias hybrida | 172 |
| Charadriiformes | Laridae | Chlidonias leucopterus | 32 |
| Accipitriformes | Pandionidae | Pandion haliaetus | 12 |
| Accipitriformes | Accipitridae | Milvus migrans | 1 |
| Accipitriformes | Accipitridae | Elanus caeruleus | 7 |
| Accipitriformes | Accipitridae | Buteo japonicus | 2 |
| Accipitriformes | Accipitridae | Circus spilonotus | 1 |
| Caprimulgiformes | Apodidae | Aerodramus brevirostris | 1 |
| Podicipediformes | Podicedidae | Tachybaptus ruficollis | 168 |
| Podicipediformes | Podicedidae | Great Crested Grebe | 142 |
| Pelecaniformes | Phalacrocoracidae | Phalacrocorax carbo | 621 |
| Pelecaniformes | Ardeidae | Egretta garzetta | 8926 |
| Pelecaniformes | Ardeidae | Ardea cinerea | 626 |
| Pelecaniformes | Ardeidae | Ardea alba | 8199 |
| Pelecaniformes | Ardeidae | Ardea intermedia | 9 |
| Pelecaniformes | Ardeidae | Bubulcus coromandus | 552 |
| Pelecaniformes | Ardeidae | Ardeola bacchus | 298 |
| Pelecaniformes | Ardeidae | Nycticorax nycticorax | 27 |
| Pelecaniformes | Ardeidae | Ixobrychus sinensis | 3 |
| Pelecaniformes | Threskiorothidae | Platalea leucorodia | 1 |
| Pelecaniformes | Threskiorothidae | Platalea minor | 438 |
| Passeriformes | Laniidae | Lanius schach | 7 |
| Passeriformes | Muscicapidae | Daurian Redstart | 1 |
| Passeriformes | Muscicapidae | Siberian Stonechat | 1 |
| Passeriformes | Muscicapidae | Saxicola maurus | 7 |
| Passeriformes | Muscicapidae | Copsychus saularis | 1 |
| Passeriformes | Muscicapidae | Monticola solitarius | 1 |
| Passeriformes | Sturnidae | Acridotheres cristatellus | 2 |
| Passeriformes | Pycnonotidae | Pycnonotus jocosus | 3 |
| Passeriformes | Pycnonotidae | Pycnonotus sinensis | 4 |
| Passeriformes | Pycnonotidae | Pycnonotus aurigaster | 2 |
| Passeriformes | Zosteropidae | Zosterops japonicus | 5 |
| Passeriformes | Leiothrichidae | Garrulax perspicillatus | 4 |
| Passeriformes | Cisticolidae | Prinia flaviventris | 4 |
| Passeriformes | Cisticolidae | Prinia inornata | 3 |
| Passeriformes | Remizidea | Chinese Penduline Tit | 65 |
| Passeriformes | Hirundinidae | Hirundo rustica | 229 |
| Passeriformes | Hirundinidae | Red-rumped Swallow | 10 |
| Passeriformes | Passeridae | Passer montanus | 30 |
| Passeriformes | Acrocephalidae | Acrocephalus orientalis | 2 |
| Passeriformes | Phylloscopidae | Phylloscopus fuscatus | 3 |
| Passeriformes | Motacillidae | Motacilla tschutschensis | 45 |
| Passeriformes | Motacillidae | White Wagtail | 4 |
| Passeriformes | Motacillidae | Anthus richardi | 2 |
| Passeriformes | Motacillidae | Anthus hodgsoni | 2 |
| Passeriformes | Motacillidae | Anthus cervinus | 10 |

TABLE 7-continued

| Order | Family | Species | Number |
| --- | --- | --- | --- |
| Passeriformes | Estrildidae | Lonchura punctulata | 2 |
| Passeriformes | Cisticolidae | Yellow-bellied Prinia | 2 |
| Passeriformes | Cisticolidae | Plain Prinia | 2 |

Experimental Example 2: Targeted Restoration of Vegetation in Yancheng Rare Bird Reserve 1. Coastal Tidal Flats Soil Improvement (Same as Experimental Example 1)
2. Ecological Unit Construction With silty tidal flats as the main implementation area, multiple ecological units were coupled to improve biodiversity, and the preferred target was wetland vegetation.

2.1 Construction of Tidal Flat Wetland Ecological Unit Based on Micro-Terrain Enhancement Technology
(1) Construction of Shallow-Water and Permanent Tidal Flats Ecological Unit in Tidal Flat Wetland Shallow waters can restore aquatic and wet plant communities (e.g. *Phragmites australis, Suaeda salsa, Salicornia europaea, Bolboschoenoplectus mariqueter*) and bird habitats (e.g. *Grus japonensis*, etc.) and increase biodiversity. The shallow water areas provide wetland birds with water, bathing and shelter from predators, as well as are habitats for amphibians, insects and spawning grounds for some fish and shrimp. Shallow terrain restoration generally reduces the overly steep area by making local micro-terrain adjustments to the undulating open area near water, and restoration of area with high terrain can create an open tidal flat suitable for wetland waterfowl. Water depth of the shallow water area of the tidal flat wetland is controlled at 0-0.2 m and 0.2-0.4 m according to different terrain heights.
(2) Construction of Permanent Water-Covering Ecological Unit in Tidal Flat Wetland (Same as Experimental Example 1)
(3) Construction of Stagnant Zone Ecological Unit in Tidal Flat Wetland (Same as Experimental Example 1)

2.2 Multi-Pathway Cascade Coupling of Tidal Flat Wetland Constructed Based on Ecological Units
(1) Soil Salinity Regulation Based on Microtopography and Water Surface Rate (Same as Experimental Example 1)
(2) Construction of Habitat Sequence Based on Landscape Remodeling (Same as Experimental Example 1)
(3) Ecological Tidal Ditch Water Salt Regulation and Vegetation Restoration Technology (Same as Experimental Example 1)

As shown in FIG. 8, vegetation restoration area is delineated, and the tidal ditch parallel to bank is constructed in the high beach to intercept fresh water from the high beach; in the low beach, tidal ditch parallel to bank is constructed, to reduce groundwater table in the middle and low beach land, relieve water accumulation state on soil of surface and middle layer of the low beach, so that process of salt replenishment of tide to soil can be fully carried out. In middle beach, a diversion channel connecting the high and low beaches, connecting the above two tidal ditches is constructed, to direct fresh water intercepted by the high beach to the low beach. In the low beach, the tidal ditch connecting the middle beach and ocean, traversing *Phragmites australis, Bolboschoenoplectus mariqueter, Suaeda salsa* beaches is constructed, which open up silt plateau formed by silt promoted by the *Phragmites australis, Bolboschoenoplectus mariqueter, Suaeda salsa*, so that connectivity between the *Phragmites australis, Bolboschoenoplectus mariqueter, Suaeda salsa* tidal flats and ocean is enhanced.

Technical method: select the area requiring vegetation control in tidal flat, divide the area into three strips including high tidal flat, middle tidal flat, low tidal flat, according to vegetation type and elevation, and investigate morphology and distribution of natural tidal ditch in each region, as a reference for ecological tidal ditch design. Use an excavator to dig a tidal ditch parallel to bank in middle beach near the side of high beach, depth of the tidal ditch is greater than 0.6 m, and width is greater than 1.2 m; in the middle beach, the tidal ditch parallel to bank is dug near the side of low beach, depth of tidal ditch is greater than 1.3 m, width is greater than 3.5 m, the natural tidal water volume encountered by the high beach is small without too much space needed, and the natural tidal water encountered by the low beach is large, and more space is needed to ensure smooth flow of water; the soil generated by excavating the tidal trench can be evenly accumulated in the middle tidal flats area; use an excavator to dig a diversion channel perpendicular to bank between the tidal ditches, depth of the diversion channel is greater than 0.8 m, and width is greater than 2.2 m; function is to promote the smooth flow of tidal water; the depth and width of the diversion channel can be appropriately changed according to topography and soil siltation degree of the passing area, and the natural tidal ditch in the area can be imitated, which can guide the tidal water without silting.

(4) Technologies to Enhance Biodiversity Through Habitat Complexity Modification Technical methods: as shown in FIG. 9, through investigation of target habitat combined with construction target and status quo, microterrain is modified and structured, so as to achieve improvement of soil factors, restoration of vegetation communities and habitats, and improvement of ecosystem biodiversity.

3. Restoration Effect

Restoration period for this example was 2 years. The comparative experiments of various ecological indicators before and after restoration of tidal flat wetland are as follows:

3.1 Changes in Soil Salinity Before and After Restoration

Difference of soil salinity of tidal flats before and after restoration, 3 test areas were selected in the tidal flats restoration area, 0-30 cm surface soil was sampled, and soil salinity was measured by soil salinity analyzer, and measurement results are shown in table 8 below:

TABLE 8

| Salinity value (g/kg) | Area 1 | Area 2 | Area 3 |
| --- | --- | --- | --- |
| Before restoration | 15.33 | 12.51 | 10.79 |
| After restoration | 3.75 | 2.84 | 2.43 |

3.2 Changes in Soil Microbial Community Structure Before and After Restoration

Differences in soil microbial community structure of tidal flats before and after restoration (taking soil bacterial richness as an example), 3 experimental areas were selected in the tidal flats restoration area, 0-30 cm surface soil was sampled, and the soil bacterial alpha diversity index (Chao1 index) was measured as determination index of bacterial richness, and the specific results are shown in table 9 below:

TABLE 9

| Chaol index | Area 1 | Area 2 | Area 3 |
|---|---|---|---|
| Before restoration | 1134 | 1420 | 989 |
| After restoration | 2947 | 3241 | 3022 |

3.3 Statistical Changes in Plant Germination and Seedling Survival Before and After Restoration Germination experiment and seedling survival statistics of the tidal flats before and after restoration (taking *Suaeda salsa* as an example), 3 experimental areas were selected in the tidal restoration area, with an area of 1 square meter, 100 seeds were sown, and the seed germination rate (number of germination/100) and seedling survival rate (number of seedlings survived/100) were counted, and the statistical results of seed germination rate are shown in table 10 below:

TABLE 10

| Seed germination rate % | Area 1 | Area 2 | Area 3 |
|---|---|---|---|
| Before restoration | 57% | 52% | 58% |
| After restoration | 95% | 90% | 92% |

The statistical results of seedling survival rate are shown in table 11 below:

TABLE 11

| Seedling survival rate % | Area 1 | Area 2 | Area 3 |
|---|---|---|---|
| Before restoration | 42% | 39% | 45% |
| After restoration | 81% | 84% | 82% |

3.4 Changes in Wetland Plants Before and After Restoration

The changes of wetland plant cover before and after restoration are as follows: table 12:

TABLE 12

| Coverage % | Phragmites australis | Suaeda salsa (L.) Pall. | Bolboschoenoplectus mariqueter |
|---|---|---|---|
| Before restoration | 65% | 40% | 35% |
| After restoration | 90% | 80% | 85% |

Changes of wetland plant density before and after restoration are as follows: table 13:

TABLE 13

| Quantity/m$^2$ | Phragmites australis | Suaeda salsa (L.) Pall. | Bolboschoenoplectus mariqueter |
|---|---|---|---|
| Before restoration | 30 | 48 | 200 |
| After restoration | 80 | 100 | 800 |

Changes in wetland plant biomass before and after restoration are as follows: table 14:

TABLE 14

| kg/m$^2$ | Phragmites australis | Suaeda salsa (L.) Pall. | Bolboschoenoplectus mariqueter |
|---|---|---|---|
| Before restoration | 2.18 | 0.73 | 0.52 |
| After restoration | 5.56 | 1.27 | 1.56 |

The invention claimed is:

1. A target based tidal flat wetland restoration method comprising:
   (1) determining a target;
   (2) constructing an ecological unit by microtopography transformation on the tidal flat wetland required to be restored;
   (3) applying biochar material and salt-resistant ecological material within the ecological unit; and
   (4) performing waterfront plant configuration within the ecological unit;

wherein:
   said target is selected from one or more of groups consisting of: restoration of tidal flat wetland ecosystem function, target plant species restoration, target animal species restoration;
   said restoration of tidal flat wetland ecosystem function is selected from one or more of groups consisting of: reducing or increasing soil salinity, changing direction and/or velocity of water flow to the tidal flat wetland, enhancing soil microbial abundance, changing vegetation diversity and/or coverage, and changing animal species and/or numbers;
   said target plant species restoration refers to the target plant species is maintained or restored to dominant species;
   said target animal species restoration refers to the target animal species is maintained or restored to dominant species;
   said ecological unit is selected from two or more of groups consisting of a permanent water-covering unit, a seasonal water-covering unit, a deep-water unit, a shallow water unit, a permanent bare beach unit, an island-raised unit, an herb-dominated unit, an arbor-dominated unit, a stagnant zone unit, and a rapid flow zone unit;
   said permanent water-covering unit refers to an ecological unit in which a percentage of water area on a ground surface in all seasons is 50%-100%,
   said seasonal water-covering unit refers to an ecological unit in which the percentage of water area on the ground surface in at least one of four seasons is 20%-100%,
   said deep-water unit refers to an ecological unit in which a depth of surface water cover in all seasons is 3-5 m,
   said shallow water unit refers to an ecological unit in which the depth of surface water cover in all seasons is 0.5-1 m,
   said permanent bare beach unit refers to an ecological unit in which the ground surface is not covered with vegetation in all seasons and maintains silty soil or sandy soil influenced by natural tides;
   said island-raised unit refers to an ecological unit with a surface area of more than 5 square meters of land in the waters that is exposed to the water regardless of rise and fall of the water and where vegetation grows,
   said herb-dominated unit refers to an ecological unit with vegetation cover greater than 65% and dominant species dominated by herbaceous plants,
   said arbor-dominated unit refers to an ecological unit with vegetation cover greater than 65% and in which the dominant species is dominated by arbor,
   said stagnant zone unit refers to an ecological unit in which a velocity of water body flow at the surface at low tide is slowed to ≤0.05 m/s;
   said rapid flow zone unit refers to an ecological unit in which the velocity of the water body flow at the surface at low tide is accelerated to ≥0.25 m/s;

said biochar material comprises 60% to 80% weight percentage of tamarisk branches biochar and 40% to 20% weight percentage of *Suaeda salsa* (L.) Pall. stalk biochar;

said salt-resistant ecological material comprises the following weight portions of raw materials: 40-50 portions of nano oyster shell, 10-20 portions of *Phragmites australis* biochar, 30-50 portions of *Phragmites australis* crushing and fermentation product, said microtopography transformation includes: straightening tidal ditch into water channel or directly excavating tidal ditch or water channel to form a rapid flow zone unit in a rapid flow zone unit, and/or, building mound or water guide bridge to form a stagnant zone unit in a stagnant zone ecological unit, and/or, deeply-excavating substrate to form an island-raised unit with a deep water area of 0.5-1 m depth in a pit ecological unit, and/or, cutting down the excessive steep slope in the shallow water ecological unit, controlling the terrain height of 0-4 m to form seasonal water-covering unit and/or shallow water unit and/or permanent bare beach unit, and/or deeply digging substrates in open water ecological units and leveling terrain to form deep water unit and/or permanent water-covering unit, and/or, within the open water ecological unit, deep excavation of the substrate and leveling of a topography to form a deep water unit and/or a permanent water unit, and/or, lowering the ground elevation below a ground elevation boundary $H_0$ to increase soil salinity or increasing the ground elevation above the ground elevation boundary $H_0$ to decrease soil salinity, and/or, constructing dike and/or wave abatement zone along a coast/river/lake, said ground elevation boundary $H_0$ equals to the sum of a groundwater table elevation $H_{water}$ and a capillary water rise height $H_{rise}$, and said waterfront plant configuration refers to reserving target plant and/or manually transplanting of target plant.

2. The target based tidal flat wetland restoration method according to claim 1, wherein the target plant is selected from the following native mangrove plants: *Phragmites australis, Bolboschoenoplectus mariqueter, Suaeda salsa, Salicornia europaea, Cyperus malaccensis, Scirpus validus, Arundo donax, Phragmites karka, Enhalus acoroides, Kandelia obovata, Aegiceras corniculatum, Rhizophora apiculata, Acanthus ilicifolius, Acrostichum aureum, Sonneratia caseolaris, Sonneratia apetala, Excoecaria agallocha, Nypa fruticans, Sonneratia alba, Heritiera littoralis, Avicennia marina*; and wherein:

the classification to which said target animal belongs is selected from: Anseriformes, Accipitriformes, Coraciiformes, Charadriiformes, Accipitriformes, Cuculiformes, Ciconiiformes, Caprimulgiformes, Podicipediformes, Pelecaniformes, Passeriformes, Sulidae;

and/or when the target is the restoration of tidal flat wetland ecosystem function, at least six ecological units are constructed on the tidal flat wetland;

and/or when the target is the target plant species restoration, the permanent water-covering unit, deep water unit, shallow water unit, permanent bare beach unit, island-raised unit, herb-dominated unit, arbor-dominated unit, stagnant zone unit are constructed on the tidal flat wetland;

and/or when the target is the target animal species restoration, the permanent water-covering unit, deep-water unit, shallow water unit, permanent bare beach unit, island-raised unit, herb-dominated unit, arbor-dominated unit, rapid flow zone unit are constructed on the tidal flat wetland.

3. The target based tidal flat wetland restoration method according to claim 1, wherein:

said applying biochar material and salt-resistant ecological material within the ecological unit comprises adding biochar material and salt-resistant ecological material by rototilling soil in the unit at a depth of 30-80 cm, preferably 50 cm;

and/or said biochar material and anti-salt ecological material are applied in an amount of 50-200 g/m² respectively;

and/or said nano oyster shell is natural oyster shell calcined and ground into a nano-level product;

and/or said *Phragmites australis* biochar is biochar product after charring *Phragmites australis* straw;

and/or said *Phragmites australis* crushing and fermentation product is product of fermenting *Phragmites australis* straw with decomposing agent;

and/or moisture content of said *Phragmites australis* crushing and fermentation product is controlled of 30% to 40%.

4. The target based tidal flat wetland restoration method according to claim 1, wherein the method includes:

reducing the ground elevation below the ground elevation threshold $H_0$ while increasing the water surface ratio to 50%-100% and reducing the vegetation coverage to 10%-50% to increase soil salinity;

or increasing the ground elevation above the ground elevation boundary $H_0$ while decreasing the water surface rate to 10%-30% and increasing the vegetation coverage to 80-90% to decrease soil salinity.

5. The target based tidal flat wetland restoration method according to claim 1, wherein abandoned fish ponds or a bare flat on the tidal flat wetlands required to be restored are performed microtopography transformation to build ecological unit.

6. The target based tidal flat wetland restoration method according to claim 1, wherein the microtopography transformation also includes: in the rapid flow zone unit, raising terrain in direction of the incoming water, which forms a sloping terrain with a slope of 10-20 degrees with direction of the outgoing water to form a rapid flow zone.

7. The target based tidal flat wetland restoration method according to claim 6, wherein a length of the rapid flow zone is less than 100 m; and/or, a period of the tidal flat wetland restoration is 1-2 years.

8. The target based tidal flat wetland restoration method according to claim 1, wherein the microtopography transformation further comprises: constructing a high beach ditch parallel to a bank on a middle beach near a high beach side of the tidal flat wetland required to be restored, constructing a low beach ditch parallel to the bank on the middle beach near a low beach side, constructing a diversion channel connecting the high beach ditch and the low beach ditch.

9. The target based tidal flat wetland restoration method according to claim 8, wherein the high beach refers to a tidal flat area with a topography of 3-5 m, said low beach refers to a tidal flat area with a topography of 0-1 m, and said medium beach refers to a tidal flat area with a topography of 1-3 m.

10. The target based tidal flat wetland restoration method according to claim 8, wherein a depth of said high beach ditch is greater than 0.6 m and a width is greater than 1.2 m, said low beach ditch has a depth greater than 1.3 m and a width greater than 3.5 m, and said diversion channel has a depth greater than 0.8 m and a width greater than 2.2 m.

\* \* \* \* \*